(12) United States Patent
Fisher

(10) Patent No.: US 11,042,949 B2
(45) Date of Patent: Jun. 22, 2021

(54) SYSTEM AND METHOD OF SCHEDULING AND MANAGING TRAVEL ROUTES

(71) Applicant: Jessica Fisher, Brooklyn, NY (US)

(72) Inventor: Jessica Fisher, Brooklyn, NY (US)

( * ) Notice: Subject to any disclaimer, the term of this patent is extended or adjusted under 35 U.S.C. 154(b) by 0 days.

(21) Appl. No.: 16/994,186

(22) Filed: Aug. 14, 2020

(65) Prior Publication Data
US 2021/0150647 A1 May 20, 2021

Related U.S. Application Data

(60) Provisional application No. 62/935,457, filed on Nov. 14, 2019.

(51) Int. Cl.
| | | |
|---|---|---|
| *G06Q 10/02* | (2012.01) | |
| *G06Q 10/04* | (2012.01) | |
| *G06Q 50/14* | (2012.01) | |
| *G06Q 50/30* | (2012.01) | |
| *G06Q 30/06* | (2012.01) | |
| *G06Q 30/08* | (2012.01) | |
| *G06F 16/9535* | (2019.01) | |

(Continued)

(52) U.S. Cl.
CPC .............. *G06Q 50/14* (2013.01); *G06F 9/54* (2013.01); *G06F 16/22* (2019.01); *G06F 16/9535* (2019.01); *G06Q 10/025* (2013.01); *G06Q 30/0185* (2013.01); *G06Q 30/0627* (2013.01); *G06Q 30/08* (2013.01); *G06Q 50/30* (2013.01); *G08G 5/003* (2013.01)

(58) Field of Classification Search
CPC ...... G06Q 10/02; G06Q 50/14; G06Q 10/025; G06Q 30/06; G06Q 10/047; G06Q 10/10; G06Q 30/02; G06Q 30/0256; G06Q 30/0283; G06Q 30/08; G06Q 10/08; G06Q 30/0207; G06Q 30/0211; G06Q 30/0601; G06Q 30/0611; G06Q 50/28; G06Q 50/30; G06C 30/0207

See application file for complete search history.

(56) References Cited

U.S. PATENT DOCUMENTS

| | | | |
|---|---|---|---|
| 2010/0252648 A1* | 10/2010 | Robinson ............... | A01G 15/00 239/14.1 |
| 2017/0032682 A1* | 2/2017 | Moser .................... | G06Q 10/06 |
| 2020/0182637 A1* | 6/2020 | Kumar ................... | G06Q 50/14 |

* cited by examiner

*Primary Examiner* — Maroun P Kanaan
(74) *Attorney, Agent, or Firm* — Buchanan Ingersoll & Rooney PC

(57) ABSTRACT

The present disclosure provides a description of systems and methods for managing routes and travel planning. A computing device of an entity receives, from a charter flight transportation provider and via an application programming interface associated with the entity, charter flight information for a plurality of charter flights. The computing device receives, from a commercial transportation provider and via an application programming interface associated with a different entity, commercial flight information for a plurality of commercial flights. The computing device stores records for the charter flight information and the commercial flight information. The computing device provides, to a user computing device, data for the user computing device to generate a single user interface including charter flight information, commercial flight information, and fields to enter search criteria. The computing device receives, from the user computing device, user-input search criteria including user starting location, user ending location, and date of travel.

20 Claims, 17 Drawing Sheets

(51) Int. Cl.
*G06F 9/54* (2006.01)
*G06F 16/22* (2019.01)
*G06Q 30/00* (2012.01)
*G08G 5/00* (2006.01)

SYSTEM AND METHOD OF SCHEDULING AND MANAGING TRAVEL ROUTES

RELATED APPLICATIONS

The present application claims the benefit of and priority to U.S. provisional application No. 62/935,457 filed on Nov. 14, 2019, which is hereby incorporated by reference in its entirety.

FIELD

The present disclosure relates to managing flight routes and travel planning. Specifically, the present disclosure relates to coordinating charter aircraft with passengers. Additional aspects of the disclosure relate to a bid management system for bidding on spaces in a charter aircraft for a particular leg of a multi-leg charter flight. Additional aspects of the disclosure relates to management of travel planning using both charter aircraft and commercial airlines.

BACKGROUND

Aircraft provider companies provide private flights to individuals. Many of these aircraft providers leverage use of charter brokers to aid in booking individuals on their flights. The charter brokers obtain flight information from the aircraft providers. The flight information typically includes aircraft model, space/seat information, routes, and times. This information is obtained verbally, by phone, and sometimes via other means of transmitting information, including through the use of an application programming interface (API) designed to interface between the aircraft provider and the charter broker. After obtaining the flight information, charter brokers typically communicate aircraft and/or flight information to end-user customers verbally and/or by email and add some fee to the cost of the flight for his/her services. With electronically transmitted information, the broker stores the flight information in a database and provides (e.g., via a website or software application) the flight information to individuals upon request.

There are number of problems that arise in this standard use of a charter broker. First, with respect to electronically transmitted information, the aircraft providers provide preset flights routes and times to the charter broker through APIs specific to the aircraft providers. As a result, any changes to flight information (e.g., routes/times) must be transferred over these APIs. This results in a lag time in providing updated information to individuals, which results in a poor user experience. Second, individuals who book a/an aircraft/space/seat on a multi-leg flight are forced to pay for the aircraft/space/seat for the entirety (i.e., all legs) of the flight, leading individuals to pay higher prices as well as inefficiencies in the transport since the space/seat will be unused by the individual for certain leg(s) of the flight; specifically, a "two-leg" round-trip is often actually a "four-leg" trip including the Aircraft Operator's two trips back to "home base"—the purchasing customer will be changed for all legs of the trip if the aircraft does in fact need to fly back to its "home base." Third, individuals often wish to compare commercial flights with charter flights when planning for travel. Currently, these individuals must use multiple different sources—one source of flight information for commercial flights and a different source of flight information for charter flights—to attempt to compare flights and prices, which results in a poor user experience. Fourth, given that aircraft brokerage is an unregulated mechanism, end-user consumers are often unaware of mark-ups and the difference between wholesale and retail prices. Fifth, given that no other large technology-based network currently exists to facilitate the booking of "empty legs" (which occur when a plane must move between points, or a route requires pick-up points), which are often heavily discounted, a large network of consumers will enable cost-saves while simultaneously enabling greater utilization of aircraft, and therefore greater profit-potential for Aircraft Providers (including aircraft owners and operators).

Thus, there is a need for a technical solution that is rooted in computer technology to, among other things, provide updated flight information, enable more efficient use of the aircraft at a better cost to the individual, and a better user experience when planning travel.

SUMMARY

The present disclosure provides a description of systems and methods for providing and managing flight information and travel planning.

A method may utilize a computing device associated with an entity. The computing device may receive, from a charter flight transportation provider and via an application programming interface associated with the entity, charter flight information for a plurality of charter flights. The computing device may receive, from a commercial flight transportation provider and via an application programming interface associated with a different entity, commercial flight information for a plurality of commercial flights. The computing device may store, in a database, one or more records for the charter flight transportation provider based on the charter flight information for the plurality of charter flights. The computing device may store, in the database, one or more records for the commercial flight transportation provider based on the commercial flight information for the plurality of commercial flights. The computing device may provide, to a user computing device, data for the user computing device to generate a single user interface comprising charter flight information for at least one charter flight of the plurality of charter flights, commercial flight information for at least one commercial flight of the plurality of commercial flights, and fields to enter search criteria. The search criteria including a starting location selection field, an end location selection field, and a date selection field. The computing device may receive, from the user computing device, user-input search criteria comprising user starting location, user ending location, and date of travel. The computing device may query, based on the user-input search criteria, the database for records matching the user-input search criteria. The computing device may send, to the user computing device, search results associated with records matching the user-input search criteria.

A computing device may include a processor and a memory storing instructions that, when executed by the processor, causes the computing device to perform the above-described method.

A system may include a computing device configured to perform the above-described method.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 1 depicts a block diagram of a high-level system architecture for managing routes and travel planning in accordance with illustrative embodiments.

FIGS. 2A-C depict a flow diagram illustrating a process for managing routes and travel planning in accordance with illustrative embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Aspects of the technical solution include systems, apparatuses, and methods for managing routes and travel planning. The technical solution is rooted in computer technology in that specially programmed computing devices are used to remove the need to use application programming interfaces that are specific to the aircraft providers thereby reducing a lag time in providing updated flight information.

Figure 1:
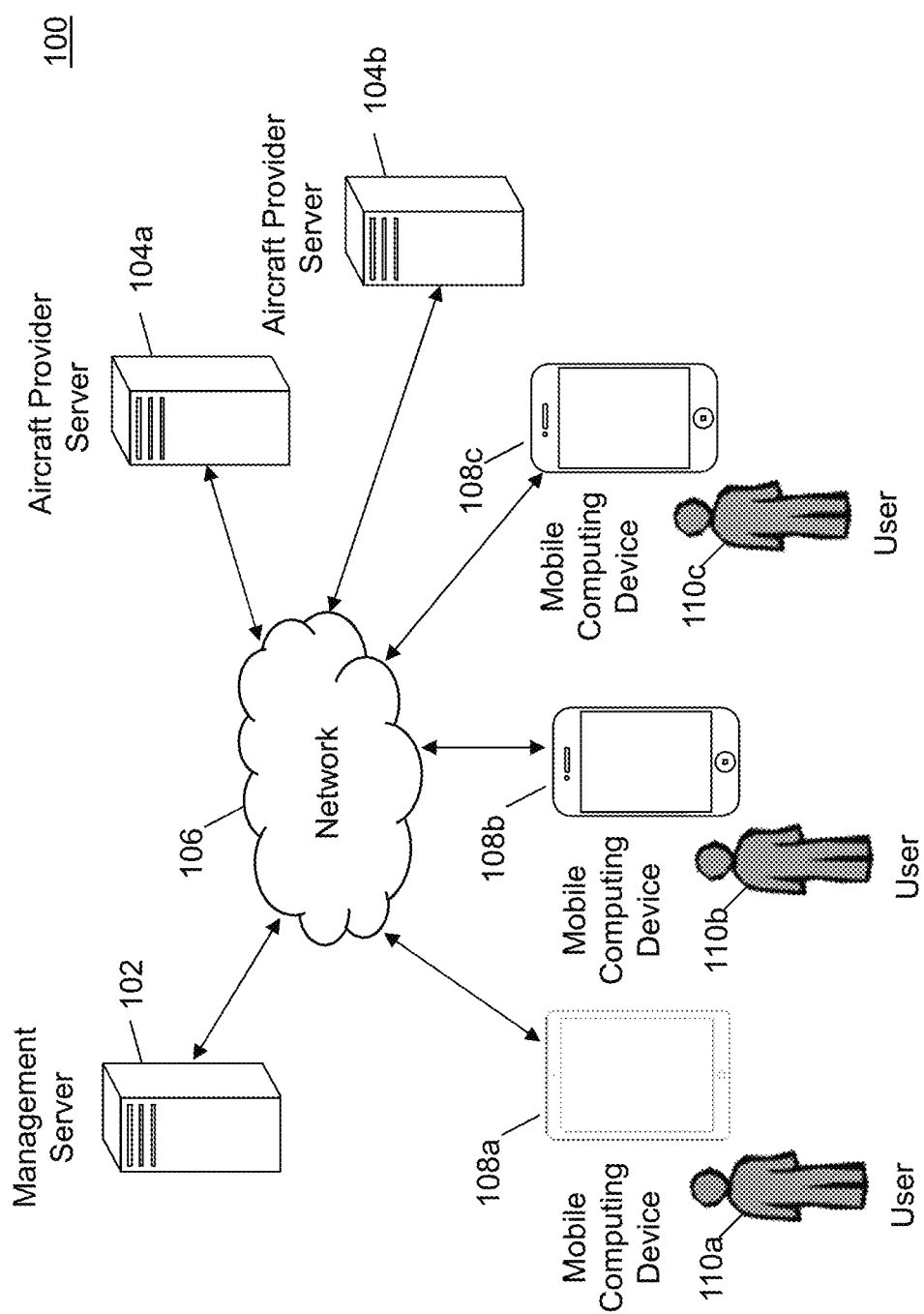

FIG. 1 depicts a block diagram of a high-level system architecture for managing routes and travel planning in accordance with illustrative embodiments. The architecture may be embodied in a system 100, which includes a management server 102, aircraft provider server 104a of a first aircraft provider, aircraft provider server 104b of a second aircraft provider, mobile computing devices 108 that are respectively operated by different users 110 (e.g., Flyers user or passengers user). Each of the servers/devices may communicate with one or more other servers/devices via one or more networks 106. The one or more networks 106 may be wired or wireless, or a combination thereof.

The aircraft providers (e.g., first and second aircraft providers not shown) may be entities (e.g., companies) responsible for providing flights using aircraft to Flyer users. The first aircraft provider may be, for example, a charter aircraft provider, which provides flights to users on either a seat-by-seat or aircraft-by-aircraft basis. The second aircraft provider may be, for example, a commercial aircraft provider, which provides flights to Flyer users on only a seat-by-seat basis. Aircraft providers have servers 104 that are responsible for managing information of the aircraft provider including financial information, aircraft information, bookings information, flight information, and the like. In some instances, the aircraft provider may provide other types of movable vehicles (e.g., truck, car, boat, etc.) in additional or in alternative to providing an aircraft. In such instances, the Flyer user may be considered a passenger user of the movable vehicle.

In past implementations, these servers 104 used APIs specific to the aircraft provider, which charter brokers downloaded information therefrom. In implementations discussed herein, no such APIs are used. Instead, only an API of the management service of a charter broker is used to obtain information from the aircraft providers. In some instances, the servers 104 may be personal computers, mobile computing devices, laptops, or any combination thereof.

Management server 102 may be responsible for managing routes and travel planning as well as coordinating bookings of aircraft of the aircraft provider by Flyer users 110. Management server 102 may act as a charter broker for the aircraft providers and users 110. The management server 102 may have its own API different from APIs of the aircraft providers. This API may be the same API used for each (e.g., all) aircraft providers. The management server 102 may provide data for aircraft provider servers 104 and mobile computing devices 108 to generate user interfaces. In some instances, the user interface may be a web interface, management server 102 may be a web server configured to provide a website or web portal including the user interface, and network 106 may be the Internet. In such instances, web interface may be in the form of HTML/Java code or other webpage code, and the aircraft provider servers 104 and mobile computing devices 108 render the user interface. The user interface may be any of the user interfaces described herein. User input in the user interfaces at the servers 104 and/or mobile computing devices 108 may be transmitted from the servers/mobile computing devices to the management server 102. In response, the management server 102 may send updated data based on the user input to update the user interfaces. In some instances, aircraft provider servers 104 and/or mobile computing device 108 may download a management software application (e.g., a mobile app) from a software store. The management software application, once installed, enables the servers 104 and mobile computing devices 108 to interface with the management server 102 via the software application. In such cases, messages may be sent between the software application installed on the server/device and the management server 102. The software application may display to the user or aircraft provider the user interfaces described herein. The management server 102 may also be responsible for managing data described herein (e.g., flight information, user information, aircraft provider information). Such data may be stored in one or more database such as a structure query language (SQL) database.

The mobile computing devices 108 may be responsible for communicating information between the users 110 and the management server 102. The mobile computing device may be a personal computer, laptop, smartphone, tablet or the like.

Figure 2A:
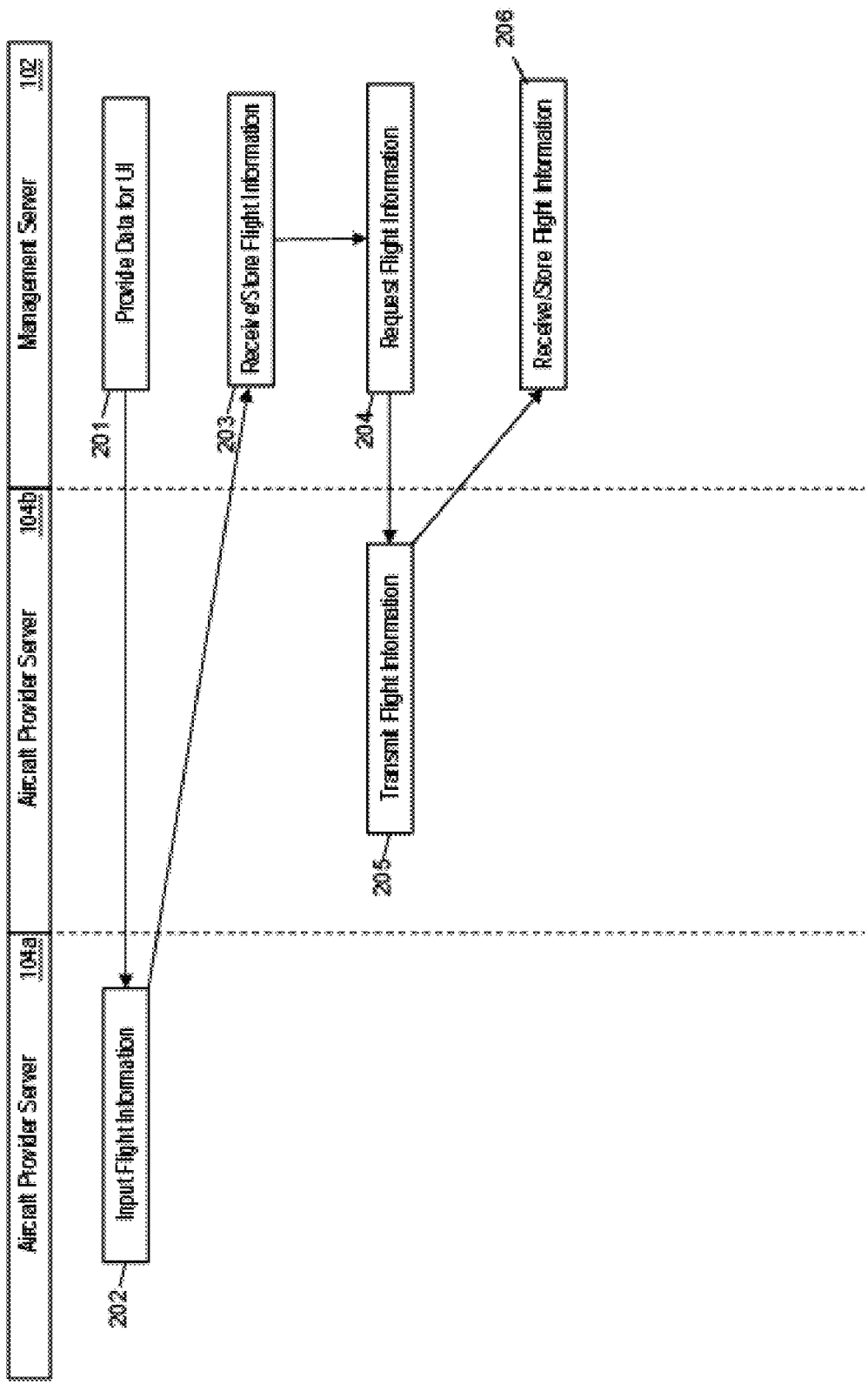
Figure 2B:
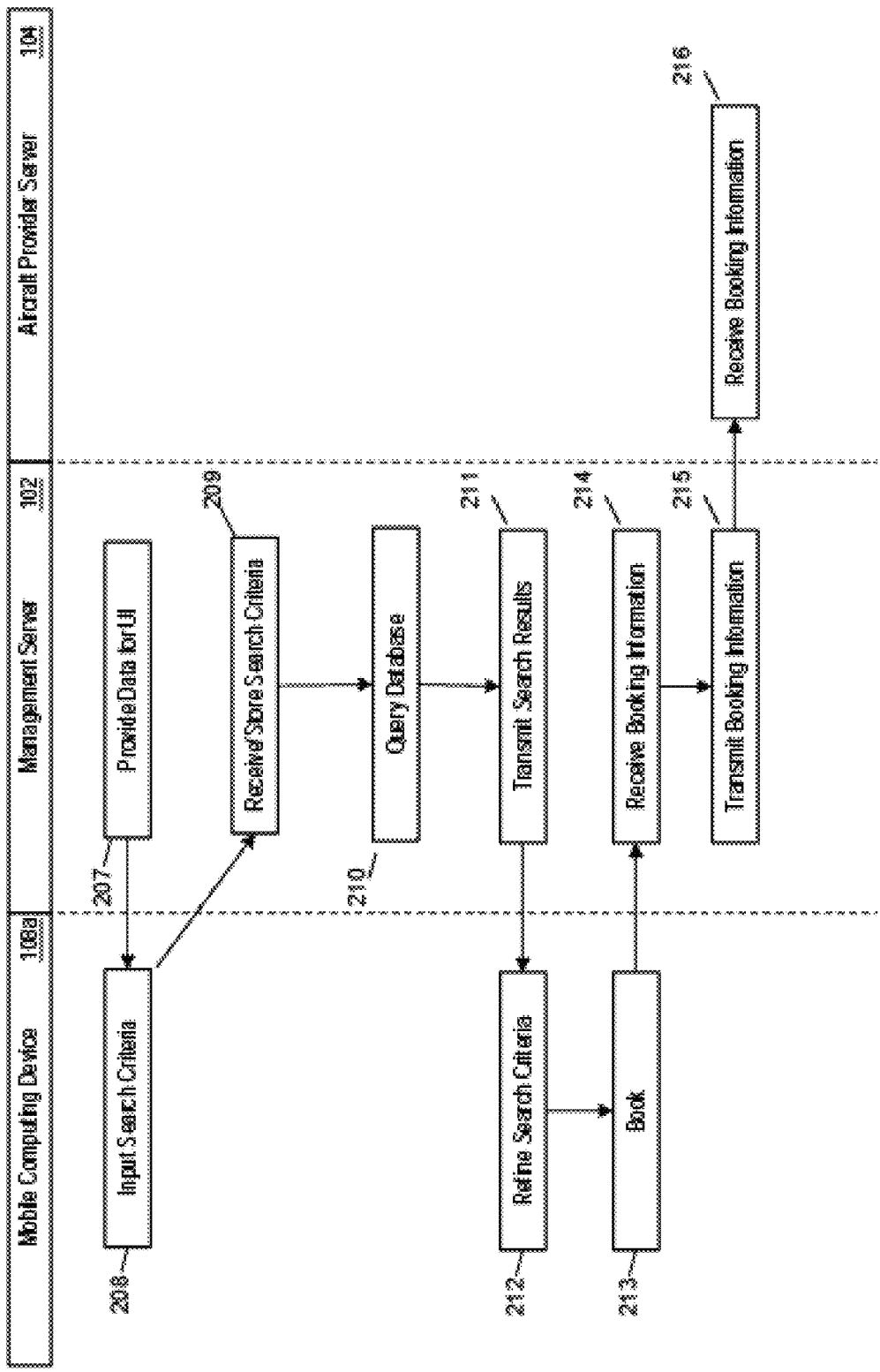
Figure 2C:
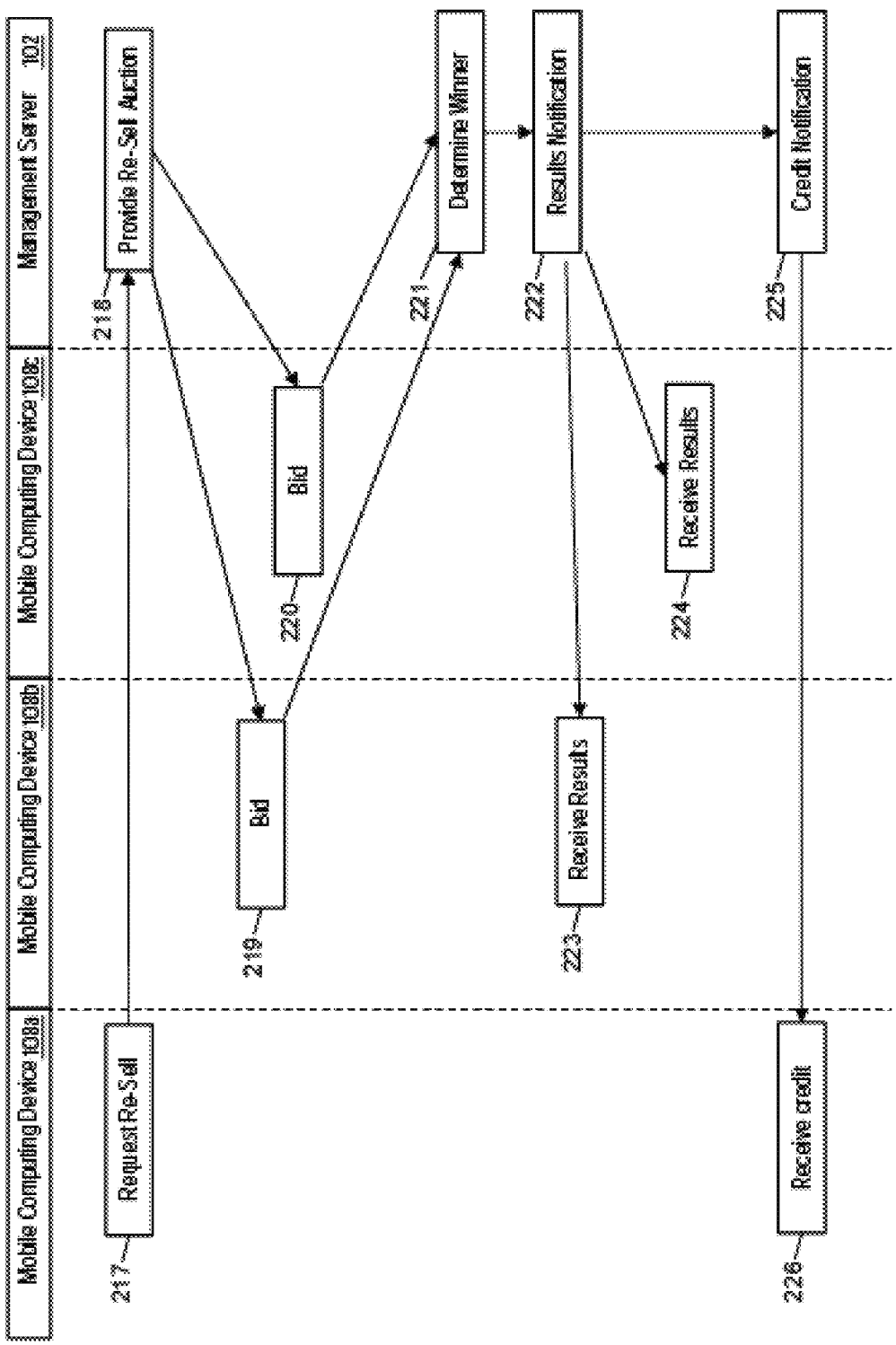

FIGS. 2A-C depict a flow diagram illustrating a process for managing routes and travel planning in accordance with illustrative embodiments. Beginning with FIG. 2A, the management server 102 may, at step 201, provide data for rendering a user interface to aircraft provider server 104a of the first aircraft provider. The data may be provided via an API of the management server 102 and not via an API of the charter aircraft provider. At step 202, the aircraft provider server 104a may render the user interface using a web browser or software application. The first aircraft provider may then input, using the aircraft provider server 104a and via the user interface, information such as flight information.

Figure 3A:
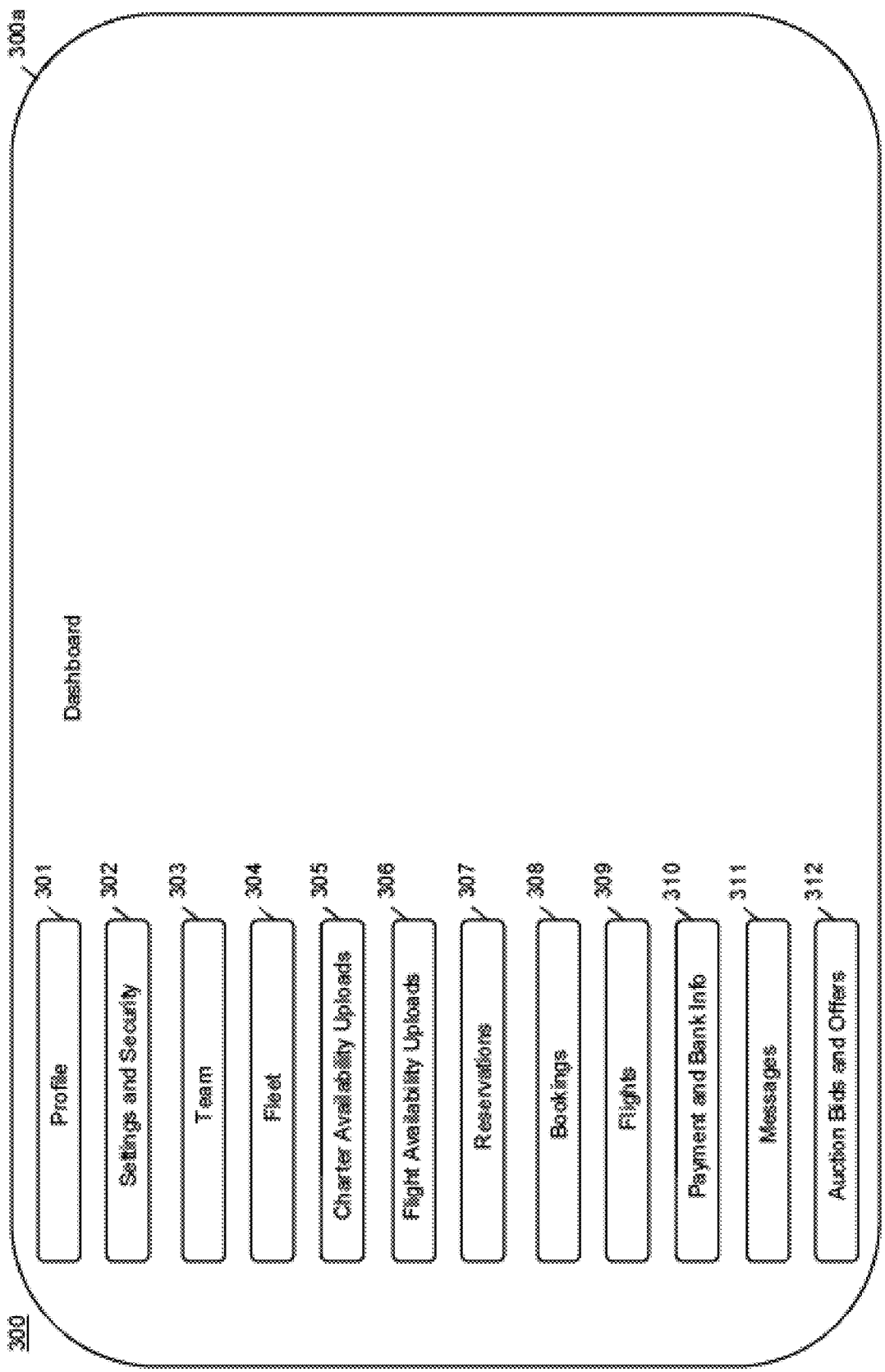
FIGS. 3A-3L depict various graphical interfaces in accordance with illustrative embodiments.

FIGS. 3A-3H depict various screens of an example user interface 300 displayed to the aircraft provider. FIG. 3A depicts an illustrative dashboard screen 300a of user interface 300. The dashboard is a welcoming screen that provides central navigation to various features of the user interface 300. The dashboard includes menu options (e.g., on-screen buttons) including profile 301, settings and security 302, team 303, fleet 304, charter availability uploads 305, flight availability uploads 306, reservations 307, bookings 308, flights 309, payment and bank information 310, messages 311, and auction bids and offers 312. Selection of profile menu option 301 causes editable fields to be presented in which the aircraft provider may provide its basic information (e.g., name, contact email, phone number, address, and the like). Selection of the settings and security menu option 302 causes editable settings and security option to be displayed. Selection of the team menu option 303 cause editable fields to add team member (e.g., flight crew members, maintenance crew members, etc.). The fields and options described herein may be edited in multiple ways. In some instances, selection of the field may permit the user to enter a value. In some instances, selection of the field causes a drop down menu of available options to select.

Figure 3B:
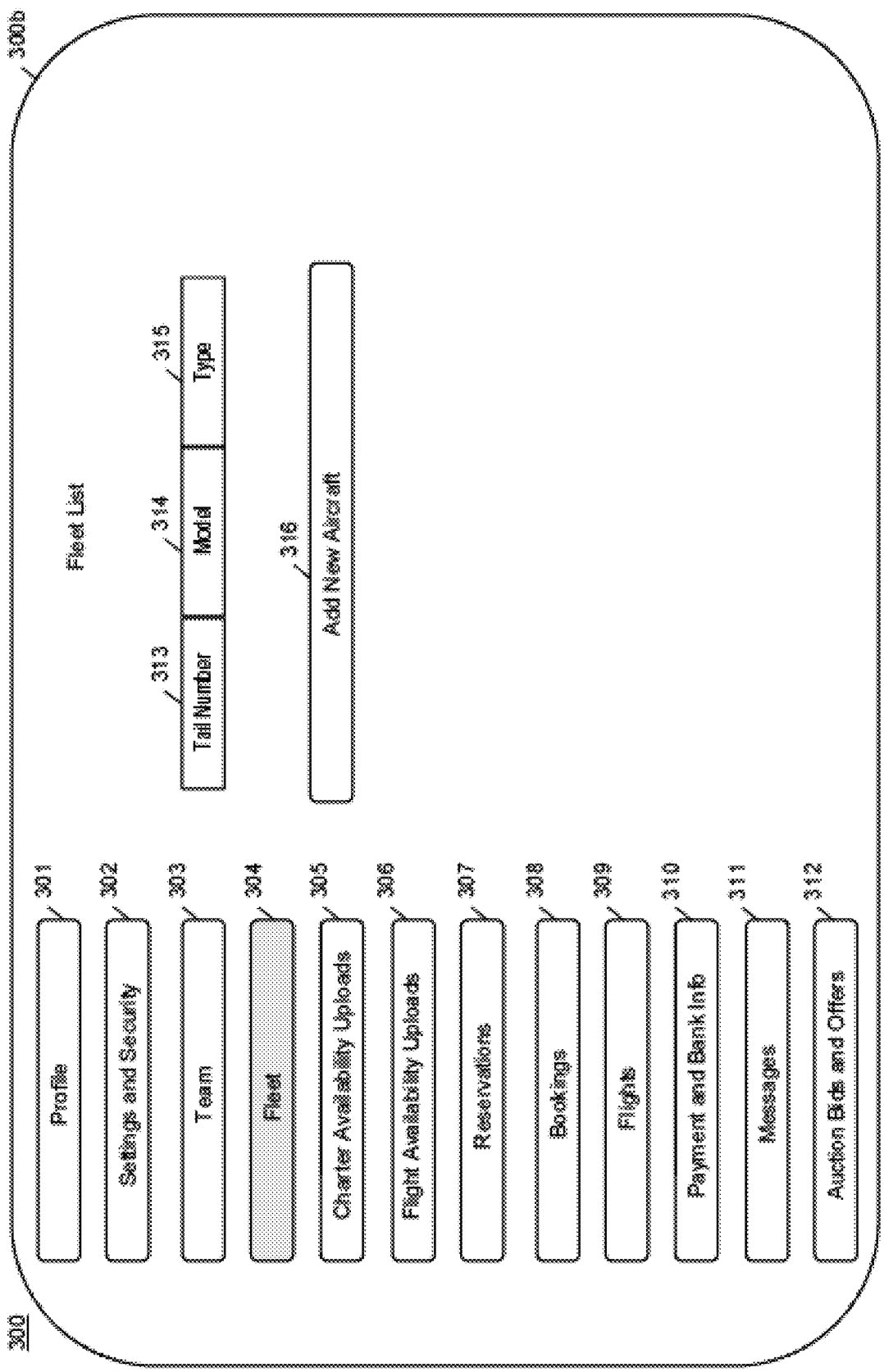

FIG. 3B depicts an illustrative screen 300*b* of user interface 300 displayed in response to the aircraft provider selecting the fleet menu option 304. The screen 300*b* may display the menu options 301-312 of the dashboard. The screen 300*b* displays a fleet list of any previously-added aircraft information, which may be stored in the database of the management server 102. The previously-added aircraft information includes tail number 313, model of the aircraft 314, and type of aircraft 315 (e.g., jet, propeller, number of engines, etc.). The screen 300*b* also include a menu option (e.g., on-screen button) 316 to add new aircraft.

Figure 3C:
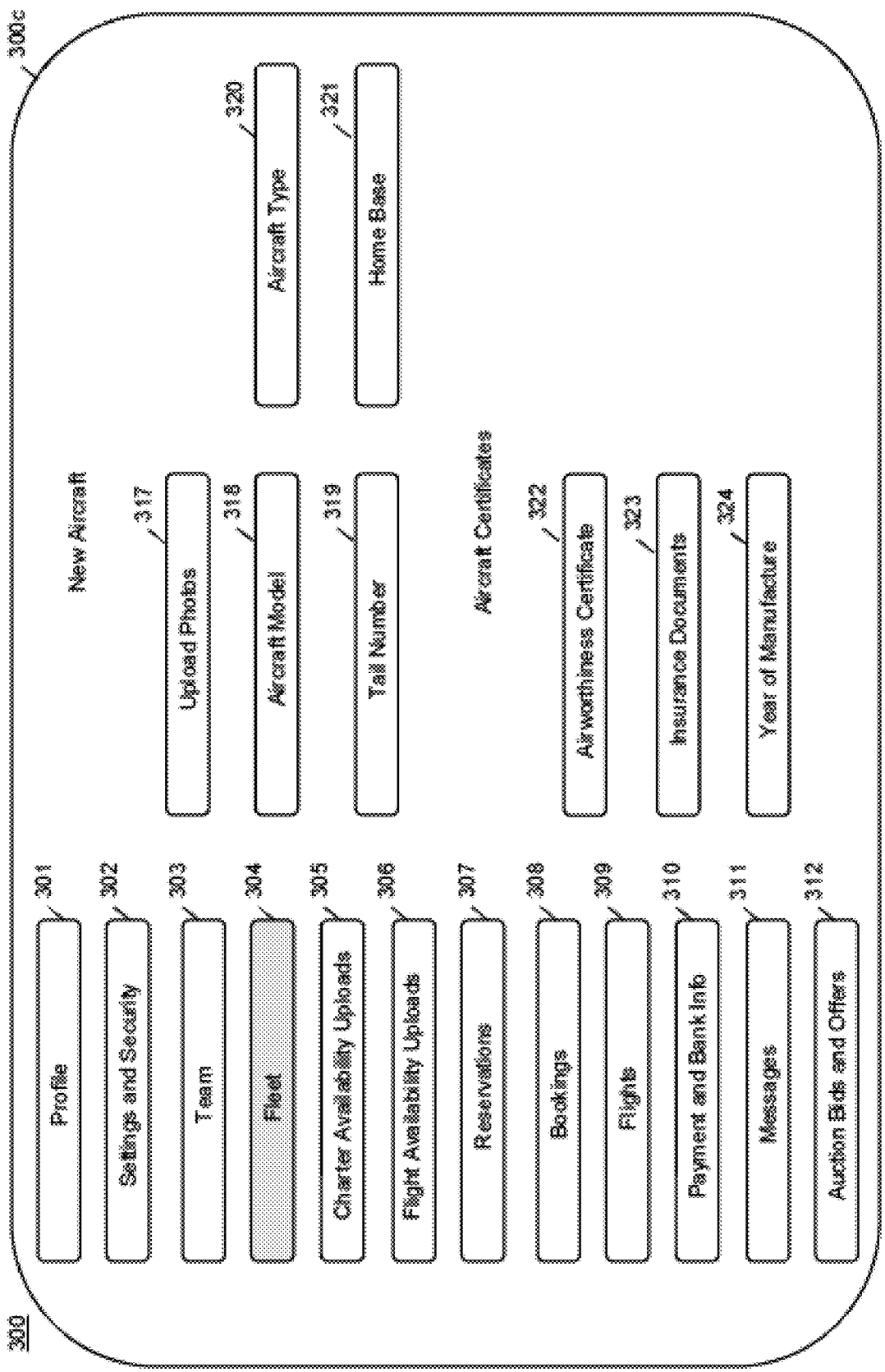

In response to a selection of the add new aircraft menu option 316, an illustrative screen 300*c* depicted in FIG. 3C of the user interface 300 may be displayed. The screen 300*c* may display the menu options 301-312 of the dashboard. The screen 300*c* may display fields for the aircraft provider to enter information about the aircraft. Such fields may include, for example, links 317 to upload photos of the aircraft, a field 318 to enter aircraft model, a field 319 to enter tail number of the aircraft, a field 320 to enter the aircraft type, a field 321 to indicate a home base of the aircraft (e.g., the aircraft most-frequent starting location), a link 322 to upload an airworthiness certificate for the aircraft, a link 323 to upload insurance documents for the aircraft, and a field 324 to enter the aircraft's year of manufacture.

Figure 3D:
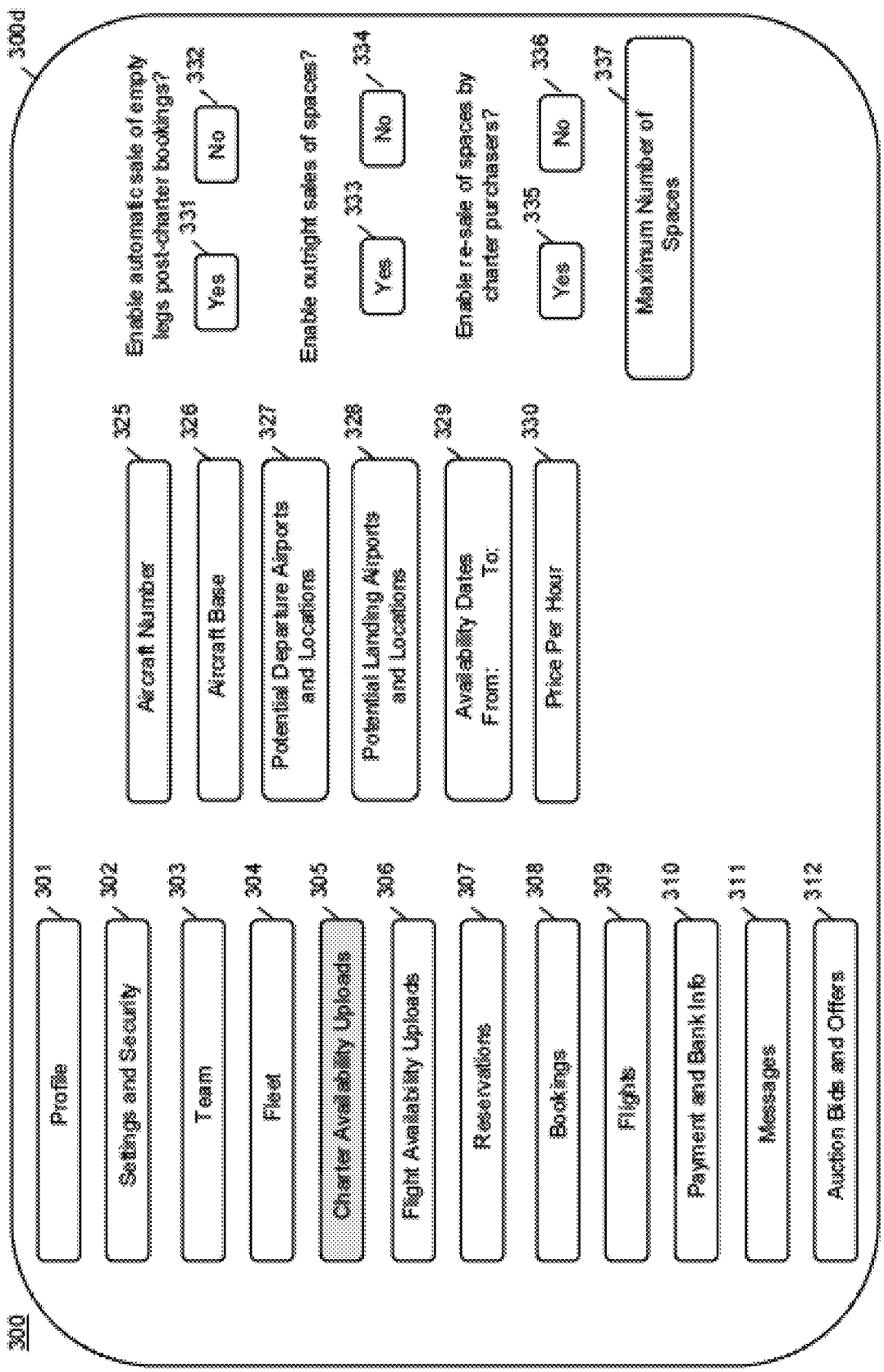

Turning to FIG. 3D, this illustrative screen 300*d* of user interface 300 is displayed in response to the aircraft provider selecting the charter availability uploads menu option 305. This screen 300*d* may permit the aircraft provider to enter information about an available charter flight. The screen 300*d* may display the menu options 301-312 of the dashboard. Additionally, the screen 300*d* may include one or more additional menu options (e.g., on-screen buttons) or editable fields. For instance, the screen 300*d* may include a field 325 to enter the aircraft number, a field 326 to enter the aircraft base (e.g., current or starting location of the aircraft), a field 327 to enter potential departure airports and locations, a field 328 to enter potential landing airports and locations, a field 329 to enter available dates the aircraft is available for charter, and a field 330 to enter price per hour. The screen 300*d* may include one or more questions for the aircraft provider to answer. A first question may be whether the aircraft provider wishes to enable sale of empty legs post-charter bookings. The screen 300*d* may include a "yes" selection option 331 and a "no" selection option 332, which may be on-screen buttons. A second question may be whether the aircraft provider wishes to enable the outright sale of spaces. The screen 300*d* may include a "yes" selection option 333 and a "no" selection option 334, which may be on-screen buttons. Spaces may be seats on the charter plane, or any other unit of space on the aircraft. A third question may be whether the aircraft provider wishes to enable re-sale of spaces by charter purchasers. The screen 300*d* may include a "yes" selection option 335 and a "no" selection option 336, which may be on-screen buttons. The screen 300*d* may include a field 337 to enter a maximum number of spaces that may be booked.

Figure 3E:
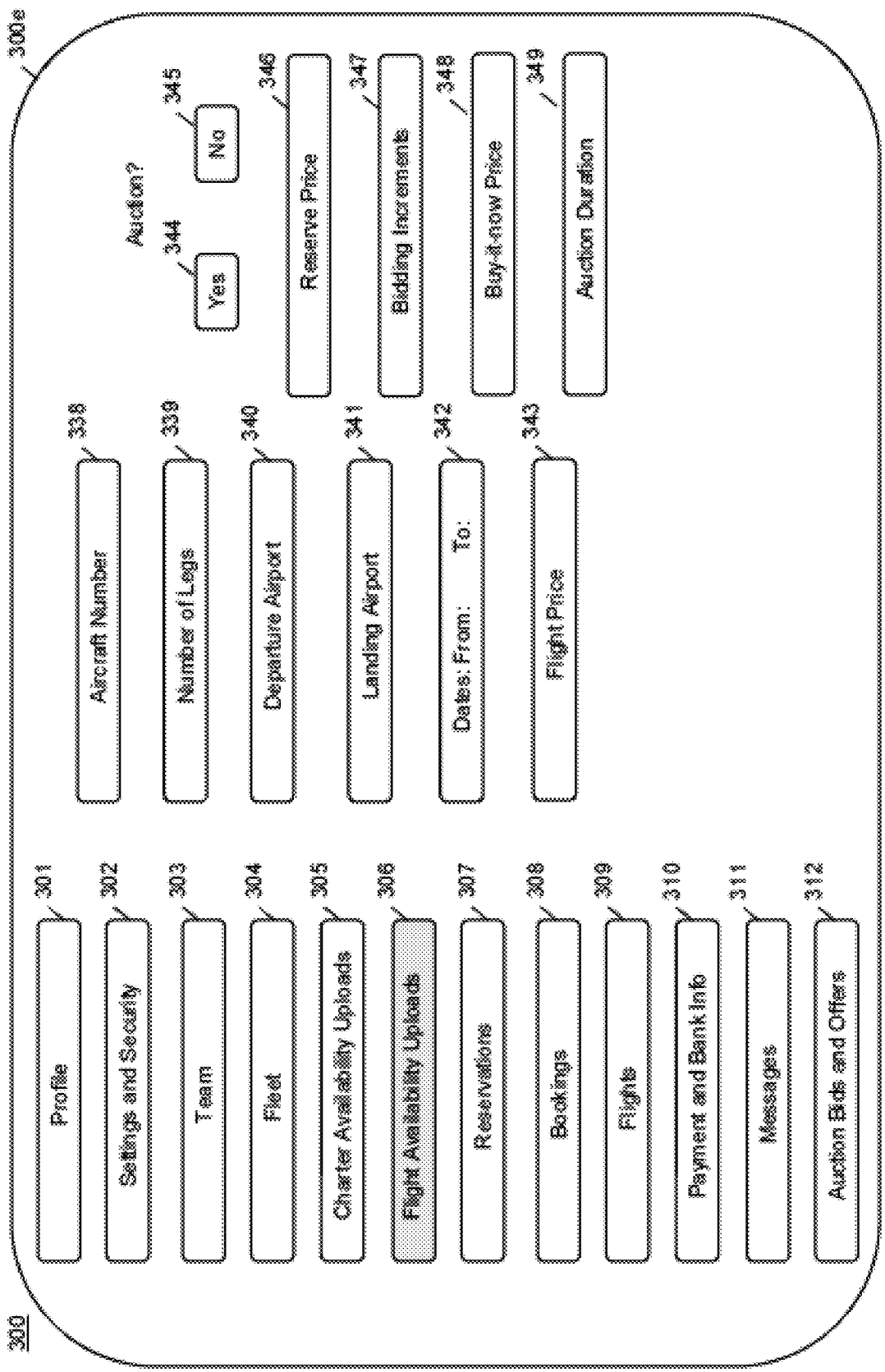

Turning to FIG. 3E, this illustrative screen 300*e* of user interface 300 is displayed in response to the aircraft provider selecting the flight availability uploads menu option 306. This screen 300*e* may permit the aircraft provider to enter information about available flights. The screen 300*e* may display the menu options 301-312 of the dashboard. Additionally, the screen 300*e* may include one or more additional menu options (e.g., on-screen buttons) or editable fields. For instance, the screen 300*e* may include a field 338 to enter the aircraft number, a field 339 to enter the number of legs (e.g., stops) for a flight route, a field 340 to enter the departure airport, a field 341 to enter the landing airport, a field 342 to enter a date range, and a field 343 to enter a flight price. The screen 300*e* may also include settings for an auction of a space or seat. To this end, the screen 300*e* may include a question whether the aircraft provider wishes to auction spaces/seats. The screen 300*e* may include a "yes" selection option 344 and a "no" selection option 345, which may be on-screen buttons. The auctions settings may include a field 346 to enter a reserve price, a field 347 to enter bidding increments, a field 348 for a buy-it-now price, and a field 349 to specify the auction's duration.

Figure 3F:
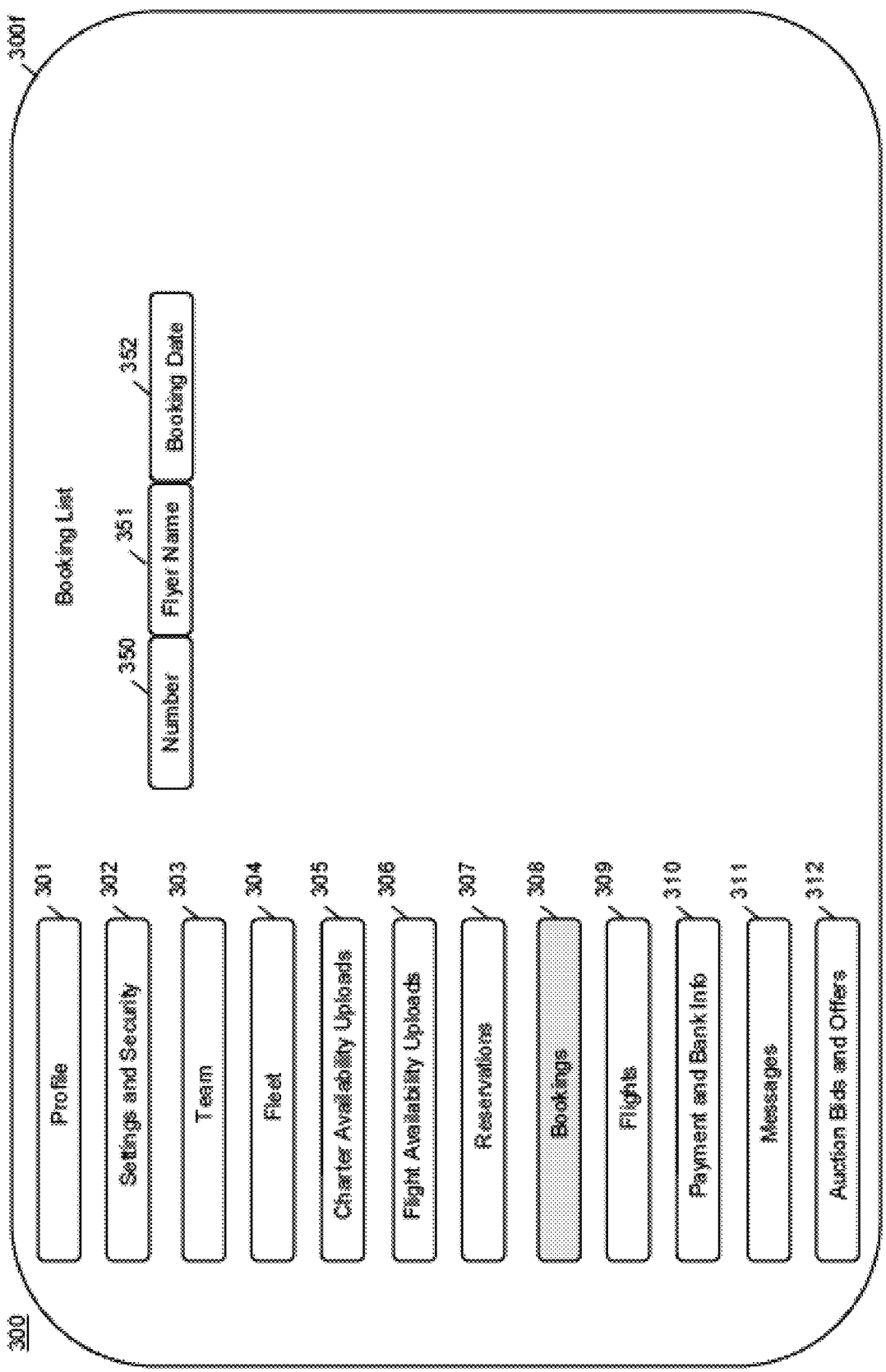

Turning to FIG. 3F, this illustrative screen 300*f* of user interface 300 is displayed in response to the aircraft provider selecting the bookings menu option 308. This screen 300*f* may permit the aircraft provider to view any current bookings for the aircraft provider. As will be described later, the process of FIG. 2 is iterative and, as a result, the aircraft provider may view user interface 300 at any time, even after other steps of FIG. 2 have been performed. The screen 300*f* may display the menu options 301-312 of the dashboard. The screen 300*f* may also include booking numbers 350, flyer names 351, and booking dates 352. This information may be in the form of a table or list.

Figure 3G:
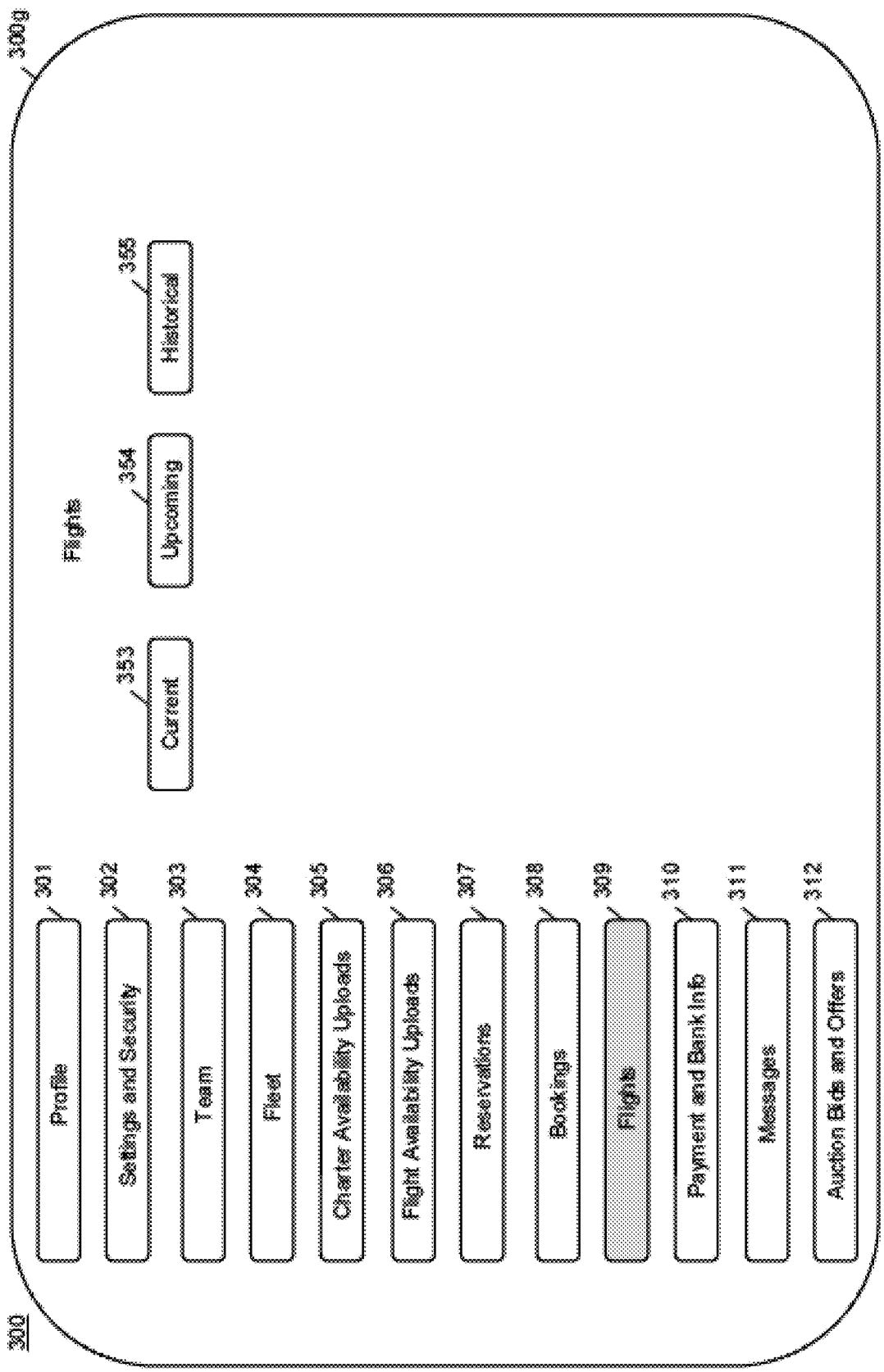

Turning to FIG. 3G, this illustrative screen 300*g* of user interface 300 is displayed in response to the aircraft provider selecting the flights menu option 309. This screen 300*g* may permit the aircraft provider to view flights. The screen 300*g* may display the menu options 301-312 of the dashboard. The screen 300*g* may also include a menu option 353 to view current flights, a menu option 354 to view upcoming flights, and a menu option 355 to view past/historical flights. These menu option may be in the form of on-screen buttons.

Figure 3H:
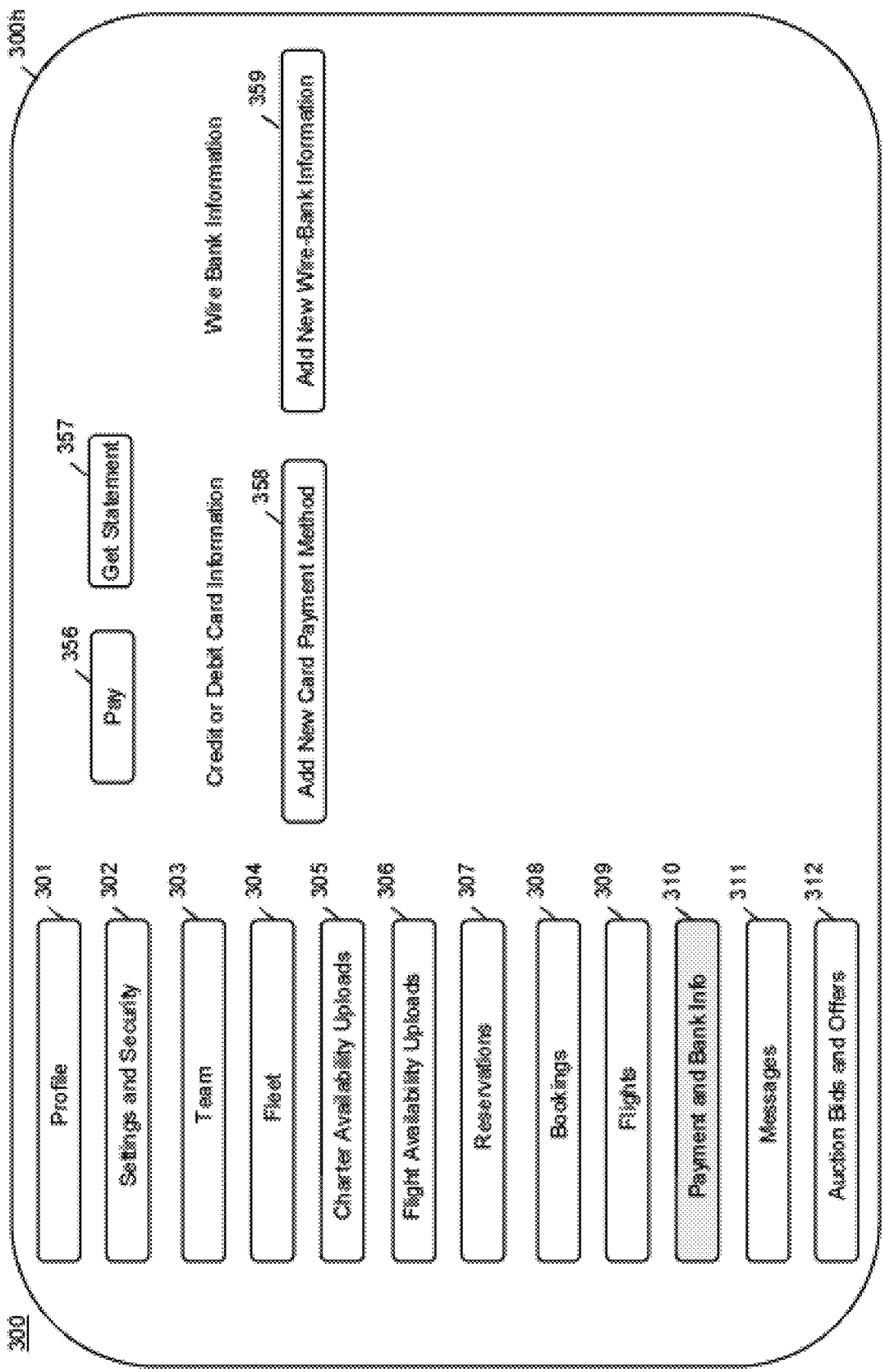

Turning to FIG. 3H, this illustrative screen 300*h* of user interface 300 is displayed in response to the aircraft provider selecting payment and bank information menu option 310. This screen 300*h* may permit the aircraft provider to manage their financial information. The screen 300*h* may display the menu options 301-312 of the dashboard. The screen 300*h* may also include a menu option 356 to make a payment, a menu option 357 to get a statement, a menu option 358 to enter a new card payment method (e.g., credit card or debit card information), and a menu option 359 to enter wire transfer information. These menu-options may be in the form of on-screen buttons.

Returning to step 202 of FIG. 2A, the aircraft provider server 104*a* transmits, to the management server 102, all information entered by the first aircraft provider in the user interface 300 (e.g., values of edited fields, indications of answers to questions, etc.). Information, entered by the first aircraft provider, concerning flight model information, flight model information, flight location information, flight availability, and charter availability may be collectively referred to as charter flight information since the first aircraft provider is a charter aircraft provider. The transmitted charter flight information may be for multiple charter flights. The information may be transmitted via the API of the management server 102 and not via an API of the charter aircraft provider, and, for commercial flights, via the API of a third-party commercial flight aggregator.

At step 203, the management server 102 receives and stores such information in its database. For instance, the management server 102 stores, in the database, one or more records for the first aircraft provider (e.g., charter flight transportation provider) based on the charter flight information for each of the charter flights. The database may be a relational database (e.g., a SQL database). Each record may include, for example, an identifier of the aircraft provider and charter flight information for a specific flight, with each of these records having the same aircraft provider identifier but different charter flight information for the different flights.

As discussed above, charter flight information entered by the aircraft provider via user interface 300 may include, among other things and for each charter flight, charter availability information, flight model information, and flight location information. Charter availability information may include, for example, a re-routing radius for a flight, one or more potential departure airports and/or locations for a flight, one or more potential landing airports and/or locations for a flight, available charter dates for a flight, a charter price per hour, and minimum cost per charter trip. The flight location information may include, for example, a current geographic location of an aircraft, a home base of the aircraft, a cost of the charter flight, one or more potential departure locations, one or more potential landing locations, potential re-routing capabilities, and a price associated with each route. The flight model information may include, for example, an image of an aircraft, aircraft type, aircraft model, safety rating of the aircraft, year of aircraft manufacture, date of last interior refurbish of the aircraft, date of last exterior refurbish of the aircraft, maximum passengers of the aircraft, a total number of hours the aircraft has flown, a speed of the aircraft, a range of the aircraft, a cargo weight capacity of the aircraft, inflight WIFI availability, a total number of televisions in the aircraft, aircraft documents, and a price per hour.

Steps 201-203 may be repeated for each charter aircraft provider wishing to utilize the management server 102. For example, another charter aircraft provider may be provided with user interface 300 to enter its information, which is then received and stored as one or more records in the database of the management server 102.

At step 204, the management server 102 may transmit a request for flight information (e.g., commercial provider information, commercial flight information, and pricing) to the aircraft provider server 104b of the second aircraft provider (e.g., a commercial aircraft provider). This request may be transmitted via an API of the commercial aircraft provider and not via the API of the management server 102. In response, at step 205, the aircraft provider server 104b obtains the requested information and transmit it to the management server 102. At step 206, the management server 102 may receive and store, in its database, the received information. The information may be transmitted via the API of the commercial aircraft flight provider (e.g., a flight aggregation service) and not via the API of the management server 102.

The transmitted information may be commercial flight information for multiple commercial flights provided by the commercial aircraft provider. The management server 102 receives and stores such information in its database. For instance, the management server 102 stores, in the database, one or more records for the second aircraft provider (e.g., commercial flight transportation provider) based on the commercial flight information for each of the commercial flights. Each record may include, for example, an identifier of the aircraft provider and commercial flight information for a specific flight, with each of these records having the same commercial aircraft provider identifier but different commercial flight information for the different flights.

The commercial flight information may include similar information as the charter flight information, but for commercial flights. For example, the commercial flight information may include aircraft number, aircraft type, route information, departure airport, landing airport, date, time, seat information, etc.

Steps 204-206 may be repeated for each commercial aircraft provider wishing to utilize the management server 102. For example, another commercial aircraft provider may be provide its flight information, which is then received and stored as one or more records in the database of the management server 102.

Figure 3I:
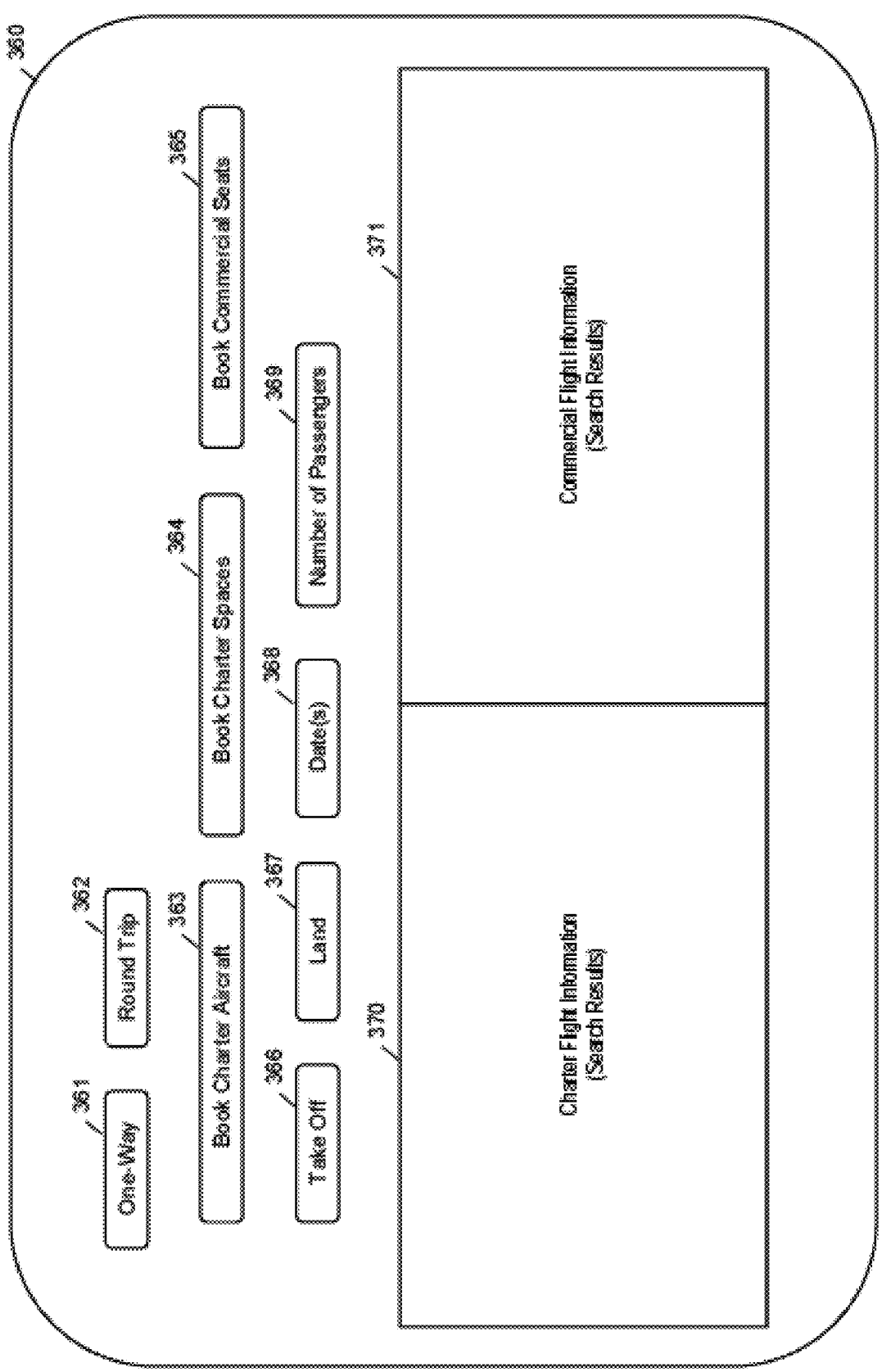

Turning to FIG. 2B, at step 207, the management server 102 may provide data for mobile computing device 108 to generate a user interface 360 as shown in FIG. 3I. The data may be transmitted via an API of the management server 102. User interface 360 including flight search criteria options including, for example, a one-way option 361, a round trip option 362, a menu option 363 to book charter aircraft, a menu option 364 to book charter spaces, a menu option 365 to book commercial seats, take off location option 366, a landing location option 367, travel dates option (e.g., start date and end date), and a field 369 to enter the number of passengers. The user interface 360 may, in some instances, include area 370 in which charter flight information for multiple charter flights is displayed and area 371 in which commercial flight information for multiple commercial flights is displayed. The flight information is populated using records of the database. The initially displayed flight information may be sample flight information. However, once user 110a enters search criteria the flight information in one or more of areas 370 and 371 is updated to display the appropriate search results. According to an illustrative embodiment, the charter flight information may be displayed simultaneously with and alongside commercial flight information on the same screen.

Returning to FIG. 2B, at step 208, the mobile computing device 108a may render the user interface using a web browser or software application. The user 110a may then input, using the mobile computing device 108a and via the user interface 360, search criteria to find flights of interest to the user 110a.

Each of these fields when selected constitute user-input search criteria. For example: if the user 110a selects one-way option 361, search criteria to find records having one-way flights is generated; if the user 110a selects round-trip option 362, search criteria to find records having round trip flights is generated; if the user 110a selects book charter aircraft option 363, search criteria to find records with option to book entire charter aircraft is generated; if the user 110a selects book charter spaces option 364, search criteria to find records having an option to book on a space-by-space basis for a charter aircraft; if the user 110a selects book commercial seats option 365, search criteria to find records having an option to book on a seat on a commercial aircraft is generated; if the user 110a selects a takeoff airport 366 (e.g., a starting location selection field), search criteria to find records having the selected airport (e.g., user starting location) as a departure airport is generated; if the user 110*a* selects a land airport 367 (e.g., an end location selection field), search criteria to find records having the selected airport (e.g., user ending location) as an arrival airport is generated; if the user selects dates 368 (e.g., a date selection field for start date and end date), search criteria to find records having the selected dates (e.g., date of travel) as the travel dates is generated; and if the user selects a number of passengers 369, search criteria to find records where the number of available seats left is equal to or greater than the selected number of passengers is generated. Search criteria may also include aircraft types and a price range.

At step 208, the mobile computing device 108*a* transmits the user-input search criteria (or indications of the user-input search criteria) to the management server 102. At step 209, the management server 102 receives the user input search criteria (e.g., user starting location, user end location, and date of travel. The information may be transmitted via an API of the management server 102. The management server 102 may store the search criteria in a user database, with a record for each user.

At step 210, the management server may formulate a query based on the user-input search criteria and search the database for records matching the query. At step 211, the management server 102 may transmit, to mobile computing device 108*a* and via the API of the management server 102, search results of records matching the query. Search results including charter flight information may be displayed in area 370 and search results including commercial flight information may be displayed in area 371. These search results of both charter and commercial flight information may be displayed on the same screen simultaneously. Search results may also include a model of an aircraft, aircraft type, aircraft safety rating, a number of fuel stops, a speed of the aircraft, a range of the aircraft, a payload weight capacity of the aircraft, inflight WIFI availability, and a number of televisions in the aircraft.

At step 212, the user 110*a* may refine the search by adjusting the search parameters in user interface 360. If there is any refinement of the search criteria, steps 208-212 may be repeated. Otherwise, the user 110*a* may select a particular flight and book, via user interface 360, either the flight or a seat on the flight at step 213. The mobile computing device 108*a* may transmit the booking selections (e.g., flights, seats, etc.) to the management server 102. At step 214, the management server 102 receives the booking selections and stores the selections in the user database. At step 215, the management server transmits the booking selection information (e.g., flights, seats, passenger information, etc.) to the aircraft provider server of the aircraft whose flight has been booked by the user 110*a*. At step 216, the aircraft provider server stores the booking selection information.

Turning to FIG. 2C, at step 217, the user 110*a* may wish re-sell the user's space/seat on one or more legs of a charter aircraft flight previously booked by the user 110*a*. To this end, the mobile computing device 108 may transmit a request to re-sell to the management server 102. The request may include a user identifier, a flight identifier, a space identifier, and identifier(s) of one or more legs. A flight may include one or more legs, each leg may include a stop at which point the aircraft lands before beginning another leg of the flight. The management server 102 may determine whether the re-sell of the space is permitted by the aircraft provider by checking the record for the flight. In FIG. 3D, the aircraft provider may input whether re-sell is permissible by charter purchasers. If the re-sell is not permitted, the management server 102 rejects the request and sends the rejection to the mobile computing device 108*a*. Otherwise, if the re-sell is permitted, then the management server 102, at step 218, creates an auction to sell the space(s) identified in the request for the identified legs of the flight. The management server 102 provides, via a website or sending a message to the software applications installed on the mobile computing devices 108*b*, 108*c*, to inform other users 110*b*, 110*c* of the auction. The auction may include auction parameters such as a reservation price, bid increments, buy-it-now price, and auction duration, each of which may be selected by user 110*a*.

At steps 219-220, each of the others users 110*b*, 110*c* may repeatedly bid (e.g., price in set increments, buy-it-now selection) until one selects the buy-it-now option or until the auction duration elapses. Bids are transmitted from the mobile computing device to the management server 102 via the API of the management server 102. At step 221, the management server 102 may determine a winner. If a user selects the buy-it-now option, the first user to select such an option is the winner. If no user 110*b*, 110*c* has selected the buy-it-now option and the auction duration has elapsed, the management server 102 determines whether any of the bids have a price greater than or equal to the minimum reservation price. If not, there is no winner as the reservation price condition has not been satisfied. Otherwise, if at least one of the bids is greater than or equal to the minimum reservation price, the user who bid the highest prices is the winner. At step 222, the management server 102 generates a result notification (e.g., winner, loser, or reservation price not met). The results notification may be specific to each user and not include other user information. At steps 223-224, the management server 102 transmits the respective results notifications to the corresponding mobile computing devices 108 for display to the users 110. At step 225, the management server 102 credits user 110*a* the amount of the winning bid or the buy-it-now price and sends the credit notification to mobile computing device 108*a* at step 226.

In some instances, the seller 110*a* may not wish to auction the space in order to re-sell the space. To this end, the request to re-sell a space on an aircraft may include a user identifier, a space identifier, flight identifier, and a space price for one or more legs. If permitted by the aircraft provider, the management server 102 may then provide the space identifier, flight identifier, and a space price for one or more legs to the other users 110*b*, 110*c* via mobile computing devices 108*b*, 108*c*. The first user to buy and agree to the re-sell would then be granted the seat. For instance, mobile computing device 108*b* may be the first device to send an acceptance to the management server 102. In such an instance, the management server 102 re-sells the seat to the user 110*b*, notifies users 110, and credits seller 110*a*.

In some cases, the management server 102 may determine a carbon offset for a booking of a user 110 based on one or more of a flight speed, a flight range, fuel burn, a flight efficiency of an aircraft model, and a specific distance associated with a given route or flight. The management server 102 may transmit a notification of the carbon offset to the user's mobile computing device.

A carbon offset is a currency-equivalent amount equal to the financial "negative" value of the carbon dioxide emissions which occur as the result of transportation, or any mechanism which results in carbon dioxide emissions. The dollar- or currency-equivalent amount may be directed toward projects that support various environmentally positive initiatives, including clean energy projects (i.e. CLP Wind Farms in India) and landfill improvement projects (non-hazardous solid waste facilities such as Seneca Meadows Landfill in Seneca Falls, N.Y.).

While the steps of FIG. 2 have been shown in a particular order, other orders are possible. Further, while only a two aircraft providers and three users are described, there may be any number of aircraft providers and users.

The process of FIG. 2 may be iterative and the user interfaces may be provided to the aircraft provider/user at any point during the process. For instance, the steps may be repeated any number of times. In such instances, user interfaces 300, 360 may be populated with information specific to the aircraft provider/user (e.g., previously entered information, bookings of users for the aircraft provider).

In one or more arrangements, the management server 102 may also be responsible for management of a passenger (e.g., Flyer) dashboard, which is designed to enable passengers to manage flight information. As an example, the passenger dashboard may enable passengers to record flight history and travel expenditures. As another example, the passenger dashboard may record reward points (e.g., referred to as FLYRewards points in the system). These points are currency-equivalent points gifted by the system with each flight booked towards the Flyer user's next flight. As yet another example, the passenger dashboard may enable carbon offsets as discussed above (e.g., referred to as FLYgreen offsets in the system). The passenger dashboard may also permit the passenger to set route-based alerts. For instance, the passenger may set an alert to be notified, via the mobile computing device 108, each time empty legs are offered in order to facilitate on-demand booking. For instance, the passenger may set an alert to be notified, via the mobile computing device 108, each time seats on desired routes are reserved, in order to facilitate group bookings.

Figure 3J:
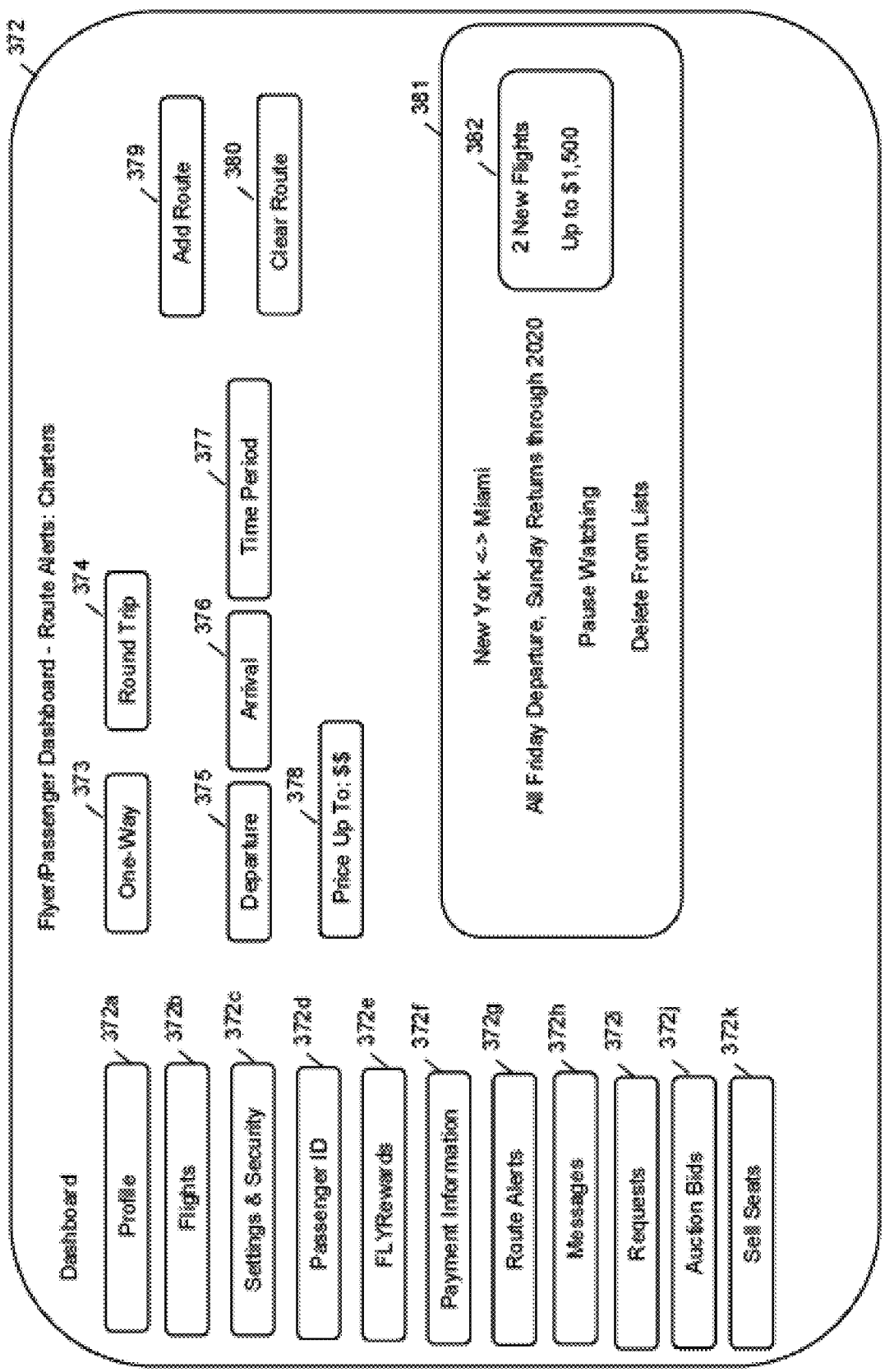
Figure 3K:
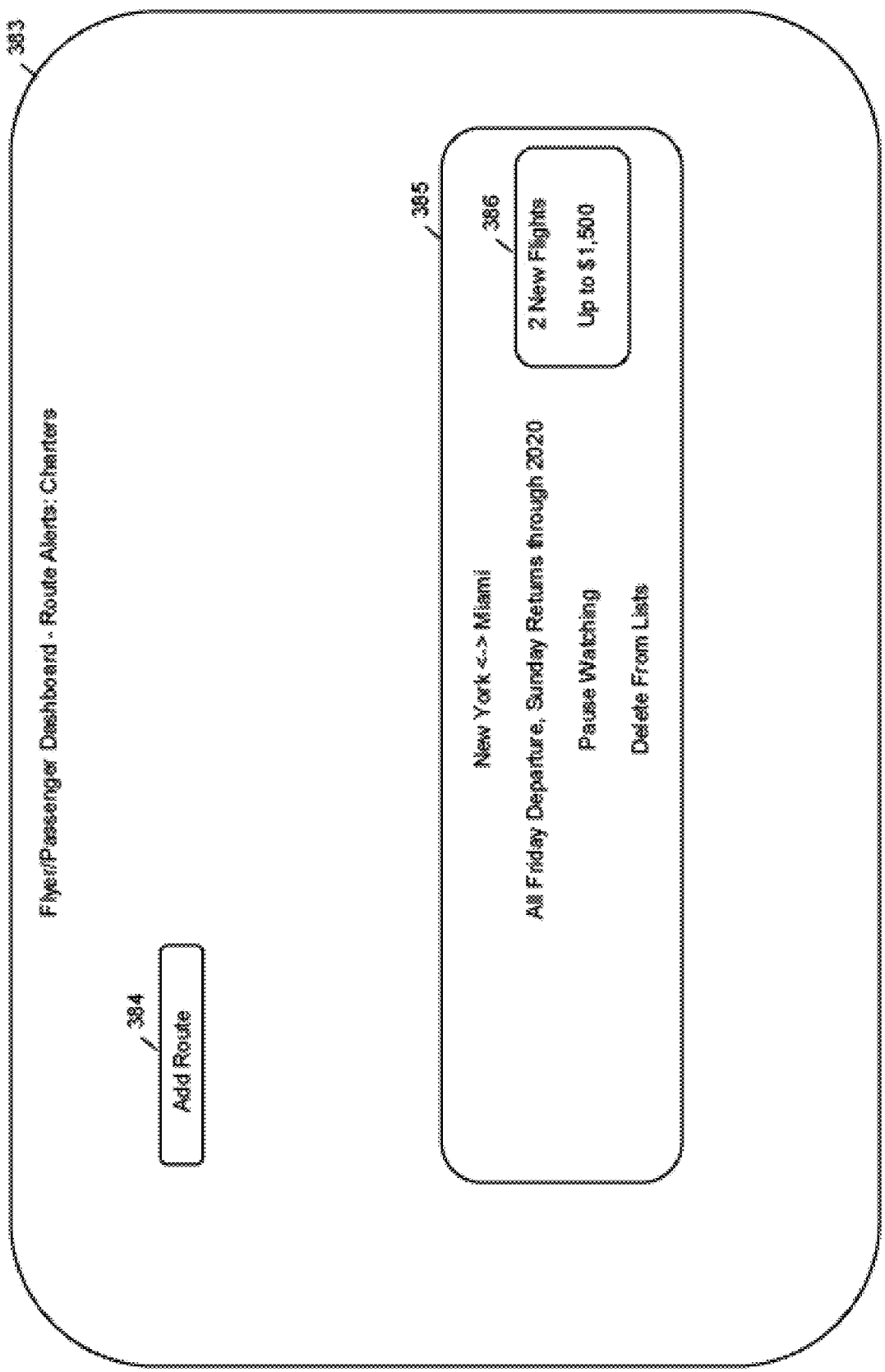

In one example, the management server 102 may provide data for mobile computing device 108 to generate a user interface 372 as shown in FIG. 3J. The data may be transmitted via an API of the management server 102. User interface 372 may be considered part of a passenger dashboard and may permit the passenger to setup alerts for charters. The user interface 372 may include an one-way option 373 or round trip option 374. The user interface 372 may include fields to enter departure 375, arrival 376, a time period 377 (e.g., dates within which the passenger is willing to travel), and a max price 378 the passenger is willing to pay for the flight. The user interface 372 may include an option 379 to add the route search parameters and an option 380 to clear the route. The user interface 372 may also include the results 381 of the alert, which includes any search parameter details and notifications 382 of any flights that match the search parameters. The user interface 372 may also include a dashboard having options to select a profile 372a, flights 372b, settings and security 372c, passenger identification information 372d, FLYRewards 372e, payment information 372f, route alerts 372g, messages 372h, requests 372i, auction bids 372j, and sell seats 372k. Another user interface 383 is depicted in FIG. 3K, which shows a simple view of the dashboard for setting alerts. The user interface 383 includes an add route option 384. The user interface 383 may also include the results 385 of the alert, which includes any search parameter details and notifications 386 of any flights that match the search parameters.

Figure 3L:
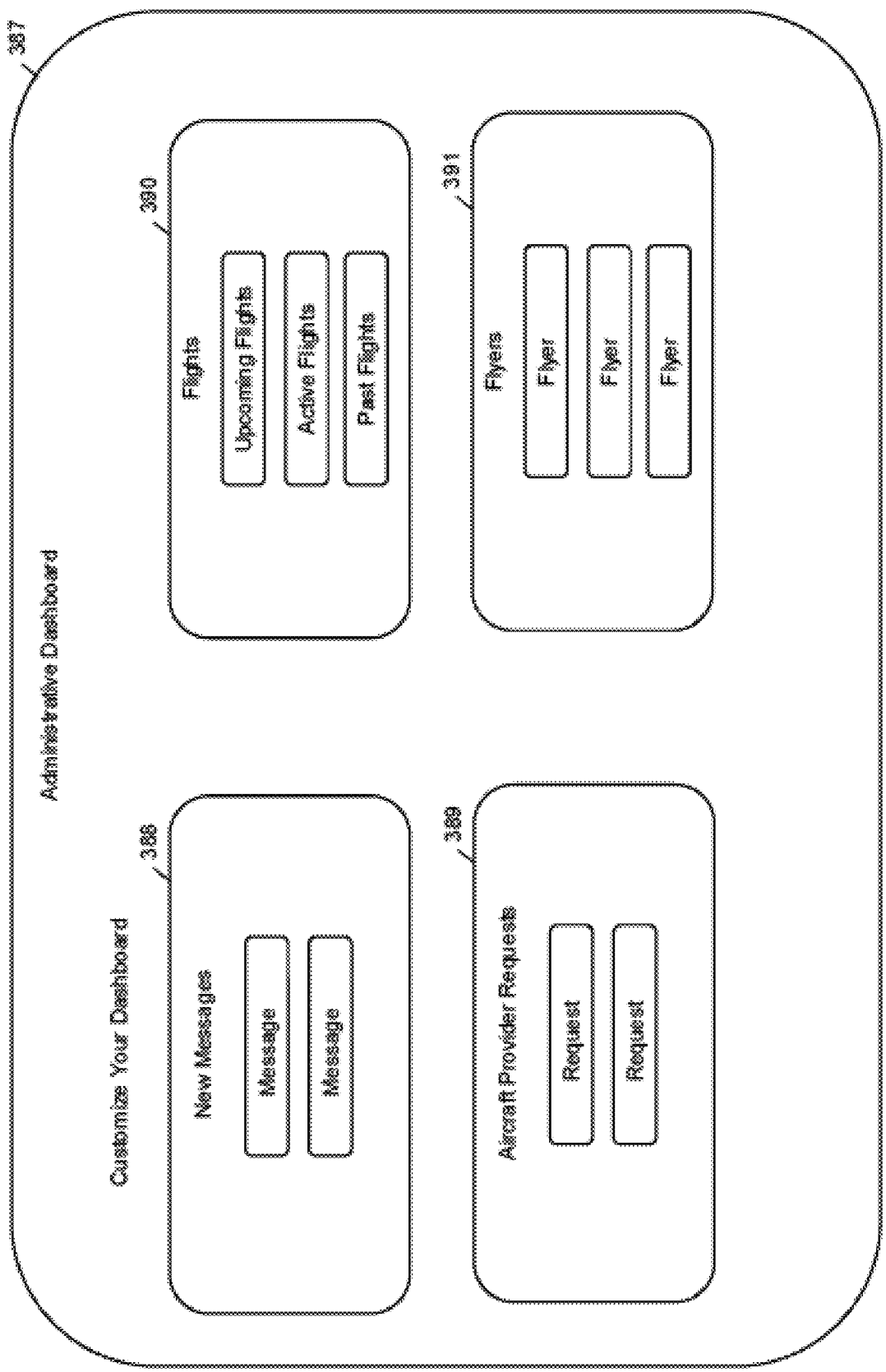

In one or more arrangements, the management server 102 may also be responsible for management of an administrative panel, which is designed to receive, record, and reconcile information about each flight booking. In one example, the management server 102 may provide data for mobile computing device 108 to generate a user interface 383 as shown in FIG. 3L. The data may be transmitted via an API of the management server 102. User interface 383 may be considered part of an administrative dashboard and may permit the passenger to manage information. For instance, the user interface 383 may be customizable and include options to view messages 388, aircraft provider requests 389, flights 390 (e.g., upcoming flights, active flights during the current day, and past flights), and flyer/passenger information 391.

While the above embodiments have been described with respect to flyer users and aircraft providers, the methods and systems discussed herein may also be applied to additional movable vehicles that operate in a "non-scheduled" capacity including, for example, cars, trucks, boats, jet skis, and the like. In such instances, references to the Flyer/users discussed above may be considered the passengers of the movable vehicle. Further, references to the aircraft may be considered the movable vehicle. References to the aircraft provider may be consider a provider of the movable vehicle.

Figure 4:
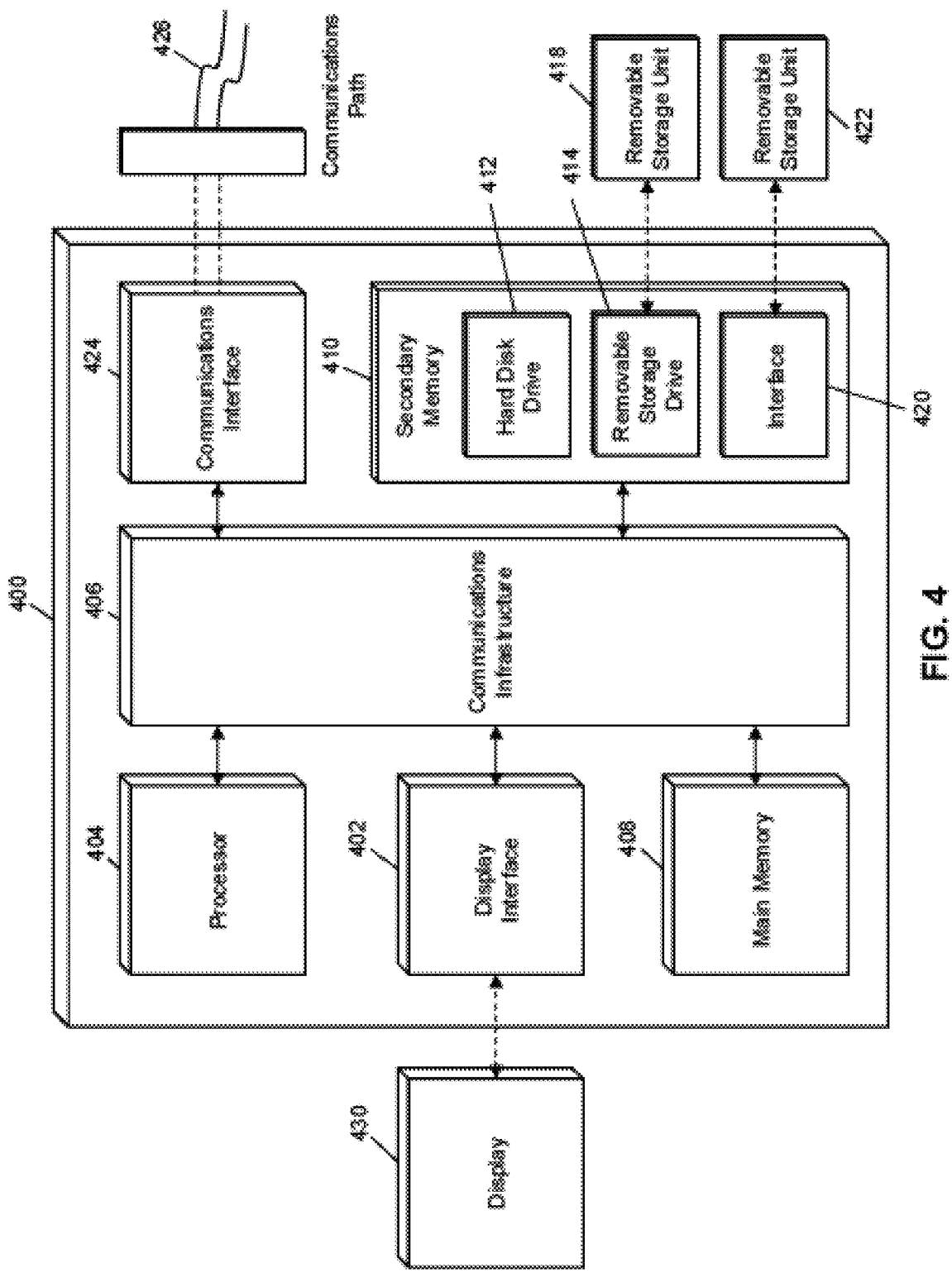
FIG. 4 is a block diagram depicting a computer system architecture in accordance with illustrative embodiments.

FIG. 4 illustrates a computer system 400 in which embodiments of the present disclosure, or portions thereof, may be implemented as computer-readable code. For example, one or more (e.g., each) of the management server 102, aircraft provider server 104, and/or mobile computing devices 108 may be implemented in the computer system 400 using hardware, software, firmware, non-transitory computer readable media having instructions stored thereon, or a combination thereof and may be implemented in one or more computer systems or other processing systems. Hardware, software, or any combination thereof may embody modules and components used to implement the method of FIG. 2.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above-described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 418, a removable storage unit 422, and a hard disk installed in hard disk drive 412.

Various embodiments of the present disclosure are described in terms of this example computer system 400. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general purpose processor device specifically configured to perform the functions discussed herein. The processor device 404 may be connected to a communications infrastructure 406, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 400 may also include a main memory 408 (e.g., random access memory, read-only memory, etc.), and may also include a secondary memory 410. The secondary memory 410 may include the hard disk drive 412 and a removable storage drive 414, such as a floppy disk drive, a magnetic tape drive, an optical disk drive, a flash memory, etc.

The removable storage drive 414 may read from and/or write to the removable storage unit 418 in a well-known manner. The removable storage unit 418 may include a removable storage media that may be read by and written to by the removable storage drive 414. For example, if the removable storage drive 414 is a floppy disk drive or universal serial bus port, the removable storage unit 418 may be a floppy disk or portable flash drive, respectively. In one embodiment, the removable storage unit 418 may be non-transitory computer readable recording media.

In some embodiments, the secondary memory 410 may include alternative means for allowing computer programs or other instructions to be loaded into the computer system 400, for example, the removable storage unit 422 and an interface 420. Examples of such means may include a program cartridge and cartridge interface (e.g., as found in video game systems), a removable memory chip (e.g., EEPROM, PROM, etc.) and associated socket, and other removable storage units 422 and interfaces 420 as will be apparent to persons having skill in the relevant art.

Data stored in the computer system 400 (e.g., in the main memory 408 and/or the secondary memory 410) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 400 may also include a communications interface 424. The communications interface 424 may be configured to allow software and data to be transferred between the computer system 400 and external devices. Exemplary communications interfaces 424 may include a modem, a network interface (e.g., an Ethernet card), a communications port, a PCMCIA slot and card, etc. Software and data transferred via the communications interface 424 may be in the form of signals, which may be electronic, electromagnetic, optical, or other signals as will be apparent to persons having skill in the relevant art. The signals may travel via a communications path 426, which may be configured to carry the signals and may be implemented using wire, cable, fiber optics, a phone line, a cellular phone link, a radio frequency link, etc.

The computer system 400 may further include a display interface 402. The display interface 402 may be configured to allow data to be transferred between the computer system 400 and external display 430. Exemplary display interfaces 402 may include high-definition multimedia interface (HDMI), digital visual interface (DVI), video graphics array (VGA), etc. The display 430 may be any suitable type of display for displaying data transmitted via the display interface 402 of the computer system 400, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 408 and secondary memory 410, which may be memory semiconductors (e.g., DRAMs, etc.). These computer program products may be means for providing software to the computer system 400. Computer programs (e.g., computer control logic) may be stored in the main memory 408 and/or the secondary memory 410. Computer programs may also be received via the communications interface 424. Such computer programs, when executed, may enable computer system 400 to implement the present methods as discussed herein. In particular, the computer programs, when executed, may enable processor device 404 to implement the methods illustrated by FIG. 2, as discussed herein. Accordingly, such computer programs may represent controllers of the computer system 400. Where the present disclosure is implemented using software, the software may be stored in a computer program product and loaded into the computer system 400 using the removable storage drive 414, interface 420, and hard disk drive 412, or communications interface 424.

The processor device 404 may comprise one or more modules or engines configured to perform the functions of the computer system 400. Each of the modules or engines may be implemented using hardware and, in some instances, may also utilize software, such as corresponding to program code and/or programs stored in the main memory 408 or secondary memory 410. In such instances, program code may be compiled by the processor device 404 (e.g., by a compiling module or engine) prior to execution by the hardware of the computer system 400. For example, the program code may be source code written in a programming language that is translated into a lower level language, such as assembly language or machine code, for execution by the processor device 404 and/or any additional hardware components of the computer system 400. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 400 to perform the functions disclosed herein. It will be apparent to persons having skill in the relevant art that such processes result in the computer system 400 being a specially configured computer system 400 uniquely programmed to perform the functions discussed above.

Techniques consistent with the present disclosure provide, among other features, systems and methods for managing routes and travel planning. While various illustrative embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method comprising:

receiving, by a computing device associated with an entity, from a charter flight transportation provider and via an application programming interface associated with the entity, charter flight information for a plurality of charter flights or a plurality of charter movable vehicles, wherein the charter flight information comprises, for a given aircraft of the charter flight transportation provider, a home base, a plurality of potential departure airports and locations, a plurality of potential landing airports and locations, and a charter price per hour;

receiving, by the computing device, from a commercial flight transportation provider, and via an application programming interface associated with a different entity, commercial flight information for a plurality of commercial flights or a plurality of commercial movable vehicles;

storing, by the computing device and in a database, one or more records for the charter flight transportation provider based on the charter flight information for the plurality of charter flights or the plurality of charter movable vehicles;

storing, by the computing device and in the database, one or more records for the commercial flight transportation provider based on the commercial flight information for the plurality of commercial flights or the plurality of commercial movable vehicles;

providing, by the computing device and to a user computing device, data for the user computing device to generate a user interface comprising charter flight information for at least one charter flight of the plurality of charter flights or at least one charter movable vehicle of the plurality of charter movable vehicles, commercial flight information for at least one commercial flight of the plurality of commercial flights or at least one commercial movable vehicle of a plurality of commercial movable vehicles, and fields to enter search criteria comprising a starting location selection field, an end location selection field, and a date selection field, wherein the charter flight information comprises charter space information and charter seat information;

receiving, by the computing device and from the user computing device, user-input search criteria comprising user starting location, user ending location, and date of travel;

querying, by the computing device and based on the user-input search criteria, the database for records matching the user-input search criteria;

sending, by the computing device and to the user computing device, search results associated with the records matching the user-input search criteria, wherein the search results comprise potential flights not yet scheduled for the given aircraft of the charter flight transportation provider based on the user-input search criteria, the home base of the given aircraft, the plurality of potential departure airports and locations of the given aircraft, the plurality of potential landing airports and locations of the given aircraft, and the charter price per hour for the given aircraft; and based on the search results and additional user input, booking, by the computing device, at least one space, portion, or seat for the given aircraft for a flight to be scheduled based on the charter price per hour for the given aircraft or at least one seat of a commercial flight.

2. The method of claim 1, wherein the charter flight information comprises charter availability information, aircraft photos, aircraft model information, and flight location information.

3. The method of claim 2, wherein the charter availability information comprises a re-routing radius, available charter dates, and a minimum cost per charter trip.

4. The method of claim 2, wherein the flight location information comprises a current geographic location of an aircraft, a cost of the charter flight, potential re-routing capabilities, and a price associated with each route.

5. The method of claim 2, wherein the aircraft model information comprises six or more of an image of an aircraft, aircraft type, aircraft model, safety rating of the aircraft, year of aircraft manufacture, date of last interior refurbish of the aircraft, date of last exterior refurbish of the aircraft, maximum passengers of the aircraft, a total number of hours the aircraft has flown, a speed of the aircraft, a range of the aircraft, a cargo weight capacity of the aircraft, inflight WIFI availability, a total number of televisions in the aircraft, and aircraft documents.

6. The method of claim 1, wherein the search criteria comprises aircraft types and a price range.

7. The method of claim 1, wherein the search results comprise five or more of a model of an aircraft, aircraft type, aircraft safety rating, a number of fuel stops, a speed of the aircraft, a range of the aircraft, a payload weight capacity of the aircraft, inflight WIFI availability, and a number of televisions in the aircraft.

8. The method of claim 1, further comprising:

providing, by the computing device, an auction for a seat on one or more legs of a multiple leg charter, wherein the auction parameters are set by a current passenger who booked the seat;

receiving, by the computing device and from the user computing device, a bid for the seat on one or more legs of the multiple leg charter; and in response to determining that a time period has elapsed and that a minimum bid threshold has been satisfied, determining, by the computing device, a winning bid for the seat.

9. The method of claim 1, further comprising:

determining, by the computing device, a carbon offset based on one or more of a flight speed, a flight range, fuel burn, a flight efficiency of an aircraft model, and a specific distance associated with a given route or flight.

10. The method of claim 1, further comprising:

receiving, by the computing device and from the user computing device, a request to re-sell a space on an aircraft and a space price; and providing, by the computing device and to other user computing devices, a space identifier associated with the space and the space price.

11. An apparatus associated with an entity, the apparatus comprising:

a processor; and a memory storing instructions that, when executed by the processor, cause the apparatus to:

receive, from a charter flight transportation provider and via an application programming interface associated with the entity, charter flight information for a plurality of charter flights or a plurality of charter movable vehicles, wherein the charter flight information comprises, for a given aircraft of the charter flight transportation provider, a home base, a plurality of potential departure airports and locations, a plurality of potential landing airports and locations, and a charter price per hour;

receive, from a commercial flight transportation provider and via an application programming interface associated with a different entity, commercial flight information for a plurality of commercial flights or a plurality of commercial movable vehicles;

store, in a database, one or more records for the charter flight transportation provider based on the charter flight information for the plurality of charter flights or the plurality of charter movable vehicles;

store, in the database, one or more records for the commercial flight transportation provider based on the commercial flight information for the plurality of commercial flights or the plurality of commercial movable vehicles;

provide, to a user computing device, data for the user computing device to generate a user interface comprising charter flight information for at least one charter flight of the plurality of charter flights or at least one charter movable vehicle of the plurality of charter movable vehicles, commercial flight information for at least one commercial flight of the plurality of commercial flights or at least one commercial movable vehicle of the plurality of commercial movable vehicles, and fields to enter search criteria comprising a starting location selection field, an end location selection field, and a date selection field, wherein the charter flight information comprises charter space information and charter seat information;

receive, from the user computing device, user-input search criteria comprising user starting location, user ending location, and date of travel;

query, based on the user-input search criteria, the database for records matching the user-input search criteria;

send, to the user computing device, search results associated with the records matching the user-input search criteria, wherein the search results comprise potential flights not yet scheduled for the given aircraft of the charter flight transportation provider based on the user-input search criteria, the home base of the given aircraft, the plurality of potential departure airports and locations of the given aircraft, the plurality of potential landing airports and locations of the given aircraft, and the charter price per hour for the given aircraft; and based on the search results and additional user input, book at least one space, portion, or seat for the given aircraft for a flight to be scheduled based on the charter price per hour for the given aircraft or at least one seat of a commercial flight.

12. The apparatus of claim 11, wherein the charter flight information comprises charter availability information, aircraft photos, aircraft model information, and flight location information.

13. The apparatus of claim 11, wherein the charter availability information comprises a re-routing radius, available charter dates, and a minimum cost per charter trip.

14. The apparatus of claim 11, wherein the flight location information comprises a current geographic location of an aircraft, a cost of the charter flight, potential re-routing capabilities, and a price associated with each route.

15. The apparatus of claim 12, wherein the aircraft model information comprises six or more of an image of an aircraft, aircraft type, aircraft model, safety rating of the aircraft, year of aircraft manufacture, date of last interior refurbish of the aircraft, date of last exterior refurbish of the aircraft, maximum passengers of the aircraft, a total number of hours the aircraft has flown, a speed of the aircraft, a range of the aircraft, a cargo weight capacity of the aircraft, inflight WIFI availability, a total number of televisions in the aircraft, and aircraft documents.

16. The apparatus of claim 11, wherein the search criteria comprises one or more aircraft types and a price range.

17. The apparatus of claim 11, wherein the search results comprise five or more of a model of an aircraft, aircraft type, aircraft safety rating, a number of fuel stops, a speed of the aircraft, a range of the aircraft, a payload weight capacity of the aircraft, inflight WIFI availability, and a number of televisions in the aircraft.

18. The apparatus of claim 11, wherein the memory stores further instructions that, when executed by the processor, cause the apparatus to:
provide an auction for a seat on one or more legs of a multiple leg charter, wherein the auction parameters are set by a current passenger who booked the seat;
receive, from the user computing device, a bid for the seat on one or more legs of the multiple leg charter; and
in response to determining that a time period has elapsed and that a minimum bid threshold has been satisfied, determine a winning bid for the seat.

19. The apparatus of claim 11, wherein the memory stores further instructions that, when executed by the processor, cause the apparatus to:
determine a carbon offset based on one or more of a flight speed, a flight range, fuel burn, a flight efficiency of an aircraft model, and a specific distance associated with a given route or flight.

20. The apparatus of claim 11, wherein the memory stores further instructions that, when executed by the processor, cause the apparatus to:
receive, from the user computing device, a request to re-sell a space on an aircraft and a space price; and
provide, to other user computing devices, a space identifier associated with the space and the space price.

* * * * *